(12) United States Patent
Mori et al.

(10) Patent No.: US 12,050,921 B2
(45) Date of Patent: Jul. 30, 2024

(54) SEMICONDUCTOR DEVICE

(71) Applicant: RENESAS ELECTRONICS CORPORATION, Tokyo (JP)

(72) Inventors: Yuki Mori, Tokyo (JP); Yuji Kubo, Tokyo (JP); Hiroshi Morita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 57 days.

(21) Appl. No.: 17/828,388

(22) Filed: May 31, 2022

(65) Prior Publication Data
US 2023/0385071 A1 Nov. 30, 2023

(51) Int. Cl.
*G06F 9/44* (2018.01)
*G06F 9/4401* (2018.01)
*G06F 21/75* (2013.01)

(52) U.S. Cl.
CPC .......... *G06F 9/4406* (2013.01); *G06F 21/75* (2013.01)

(58) Field of Classification Search
CPC ...................................................... G06F 9/44
See application file for complete search history.

(56) References Cited

U.S. PATENT DOCUMENTS

| | | | |
|---|---|---|---|
| 8,239,686 B1* | 8/2012 | Hodzic | G06F 21/52 713/187 |
| 10,055,588 B2* | 8/2018 | Henry | G06F 21/554 |
| 11,068,599 B2* | 7/2021 | Montero | G06F 21/64 |
| 2006/0026417 A1* | 2/2006 | Furusawa | G06F 21/575 713/2 |
| 2007/0130452 A1* | 6/2007 | Muir | G06F 21/44 713/1 |
| 2010/0082968 A1* | 4/2010 | Beverly | G06F 21/575 713/176 |
| 2014/0089667 A1* | 3/2014 | Arthur, Jr. | G06F 11/362 713/171 |
| 2018/0144136 A1* | 5/2018 | Nadarajah | G06F 21/575 |
| 2019/0325137 A1* | 10/2019 | Itkin | H04L 9/30 |
| 2019/0325140 A1* | 10/2019 | Alon | H04L 9/3234 |
| 2020/0074083 A1* | 3/2020 | Hou | G06F 11/1417 |
| 2022/0180005 A1* | 6/2022 | Kwok Kwong Heng | G06F 15/7807 |

FOREIGN PATENT DOCUMENTS

JP 2008-059300 A 3/2008

* cited by examiner

*Primary Examiner* — Phil K Nguyen
(74) *Attorney, Agent, or Firm* — Rimon P.C.

(57) ABSTRACT

A semiconductor device includes a processor unit, a memory storing a boot program, a reset controller and an address check unit. The reset controller controls a reset for the processor unit based on a reset request and outputs a boot address for the boot program to be executed after reset release to the processor unit. The address check unit performs a tampering check for the boot address output from the reset controller and outputs a boot address error signal based on a tampering check result.

12 Claims, 19 Drawing Sheets

SEMICONDUCTOR DEVICE

BACKGROUND

The present invention relates to a semiconductor device, and can be suitably used, for example, in a semiconductor device for executing a boot program.

In recent years, security in automobiles has become increasingly important. It is important to improve the security level of the in-vehicle semiconductor device.

The secure boot is known as one of the techniques to realize the improvement of the security level. The secure boot is a mechanism to confirm the authentication of the program at startup in order to prevent the loading of unauthorized programs. The secure boot is accomplished by running a secure boot program after a reset release. The secure boot program is stored in memory and executed by specifying its start address. Hereinafter, the start address of the secure boot program is referred to as the secure boot address.

Japanese unexamined Patent Application publication No. 2008-59300 (Patent Document 1) discloses a microcomputer for reading a boot program from an external ROM or a holding RAM when returning from a low power consumption mode to a normal operation mode. The microcomputer of Patent Document 1 has an address switching circuit for selecting a boot address for accessing the boot program in the external ROM and a boot address for accessing the boot program in the holding RAM.

SUMMARY

Fault injection attack is known as one of security attacks. Fault injection attack, which injects voltage or noise into the device, may cause the device to malfunction and avoid security mechanism. Intentional noise injection into the semiconductor device may cause tamper of the secure boot address. For example, if an address switching circuit for selecting a boot address as disclosed in Patent Document 1 is intentionally injected noise, an unintended boot address may be selected. In this way, the boot address is tampered, and the intended secure boot may not be executed. As a result, it may be impossible to verify the authentication of the program to be executed. In addition, unauthorized programs based on unintentional boot addresses may be executed.

Other objects and novel features will become apparent from the description of this specification and the accompanying drawings.

A semiconductor device according to one embodiment includes a processor unit, a memory storing a boot program, a reset controller and an address check unit. The reset controller controls a reset for the processor unit based on a reset request and outputs a boot address for the boot program to be executed after reset release to the processor unit. The address check unit performs a tampering check for the boot address output from the reset controller and outputs a boot address error signal based on a tampering check result.

In the semiconductor device according to an embodiment, it is possible to improve the security level of the semiconductor device.

DETAILED DESCRIPTION

Figure 1:
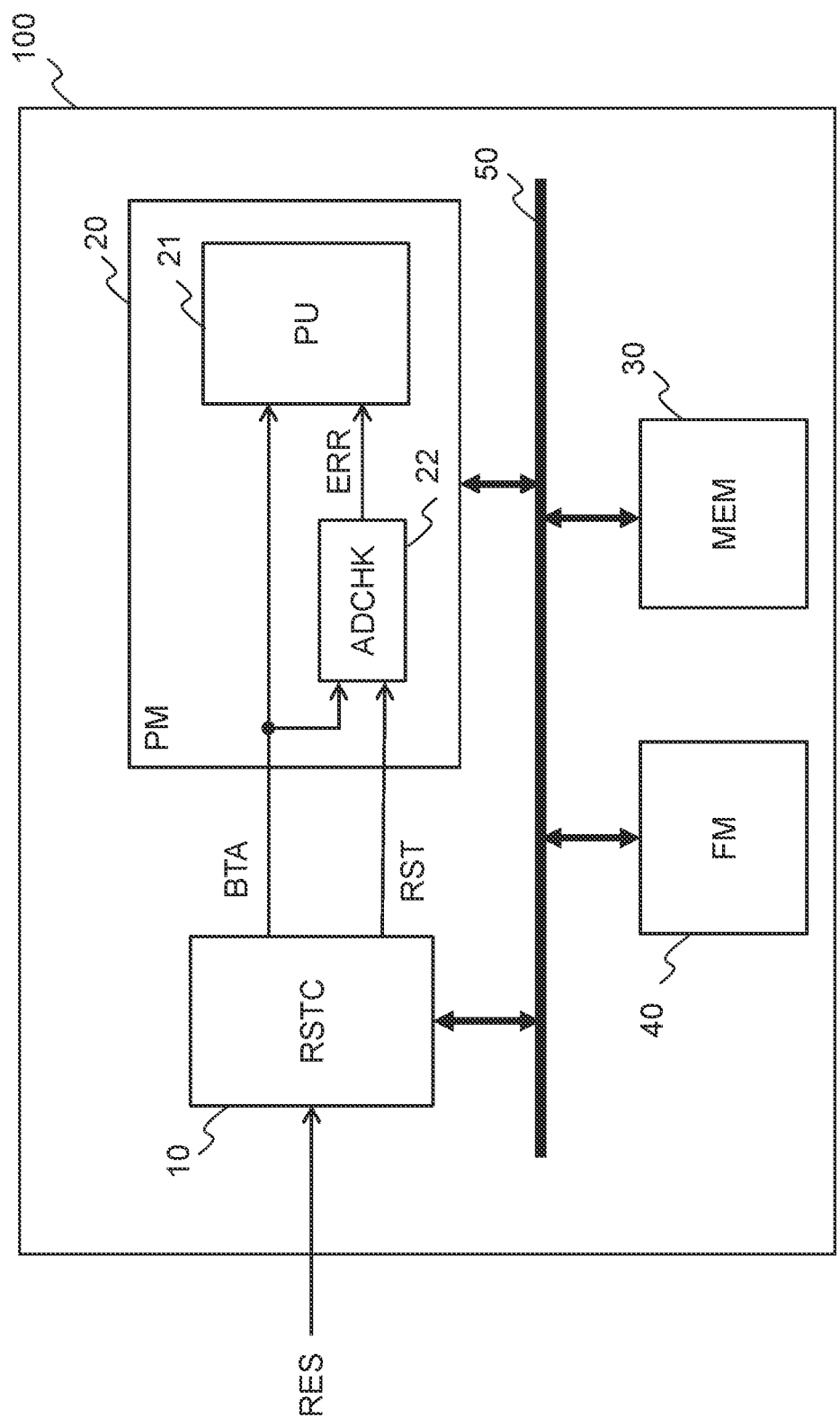
FIG. 1 is a block diagram showing a configuration example of a semiconductor device according to the first embodiment.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

First Embodiment

FIG. 1 is a block diagram showing a configuration example of a semiconductor device 100 according to the first embodiment.

The semiconductor device 100 of the present embodiment is, for example, a SoC (System On Chip) having a secure boot function, and is a semiconductor integrated circuit (LSI) formed on one semiconductor chip using a well-known semiconductor manufacturing technique. The semiconductor device 100 has a secure boot function.

The semiconductor device 100 includes a reset controller (RSTC) 10, a processor module (PM) 20, a memory (MEM) 30, a functional module (FM) 40, and a bus 50. The reset controller 20, the processor module 20, the memory 30, and the functional module 40 are connected to each other via the bus 50.

The reset controller 10, in response to an external reset signal RES input to the semiconductor device 100 from the outside, generates a reset signal RST for the internal modules of the semiconductor device 100. The internal modules are reset based on the reset signal RST. The reset signal RST is asserted for a predetermined period in response to the external reset signal RES. The reset signal RST is negated when the reset is released. When the reset is released, the reset controller 10 outputs the secure boot address BTA to the processor module 20. The secure boot address BTA is a start address of the secure boot program executed by the processor module 20 after reset release.

The processor module 20 includes a processor unit 21 and an address check unit 22. The processor unit 21 is configured to be capable of executing a program stored in the memory 30. The processor unit 21 accesses the memory 30 based on the secure boot address BTA output from the reset controller 10 when the reset is released, and then executes the secure boot program.

The address check unit (ADCHK) 22 performs a tampering check for checking whether the secure boot address output from the reset controller 10 has been tampered with, and asserts or negates a boot address error signal ERR based on the check result. The processor unit 21 determines whether or not to execute the secure boot program based on the error signal ERR.

The memory 30 stores programs executed by the processor module 20. The memory 30 stores a secure boot program for checking authentication of the programs executed after reset release. For example, such memory 30 may include a RAM (Random Access Memory) and a ROM (Read Only Memory).

The function module 40 is a dedicated processing circuit for executing a specific process. Such functional module 40 may include a DMAC (Direct Memory Access Controller) or an image-processing circuit. Although only one functional module is shown in FIG. 1, the number of functional modules is not limited thereto.

The bus 50 is connected components of the semiconductor device 100, as described above. For example, such bus 50 may include an AXI bus conformed with the AXI protocol. The bus 50 includes a bus controller (not shown). For example, the bus control unit receives a memory access request issued by the processor unit 21 through the bus 50. The bus control unit requests access to the memory 30 based on the memory access request from the processor unit 21.

Figure 2:
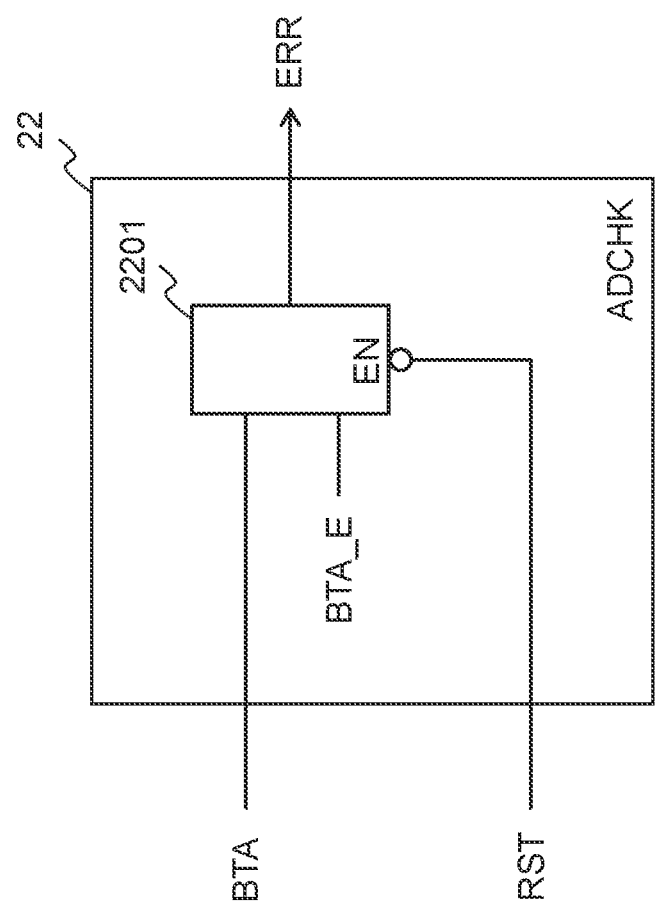
FIG. 2 is a block diagram showing a configuration example of an address check unit according to the first embodiment.

FIG. 2 is a block diagram showing a configuration example of the address check unit 22 according to the present embodiment. The address check unit 22 includes a comparison circuit 2201. The comparison circuit 2201 compares the secure boot address BTA from the reset controller 10 with the secure boot address expected value BTA_E, and outputs the comparison result as a secure boot address error signal ERR. If the secure boot address BTA from the reset controller 10 matches the secure boot address expected value BTA_E, the comparison circuit 2201 negates the secure boot address error signal ERR, assuming that the boot address BTA output by the reset controller 10 is the correct (not tampered with) address. On the other hand, if the secure boot address BTA from the reset controller 10 does not match the secure boot address expected value BTA_E, the comparison circuit 2201 asserts the secure boot address error signal ERR, assuming that the boot address BTA output by the reset controller 10 has been tampered with. In this manner, the address checking unit 22 checks for tampering with the secure boot address BTA output from the reset controller 10.

Further, the comparison circuit 2201 is enabled based on the reset signal RST. Specifically, when the reset signal RST is in a negate state in response to a reset release, the comparison circuit 2201 becomes in an enable state and performs a comparison operation.

Figure 3:
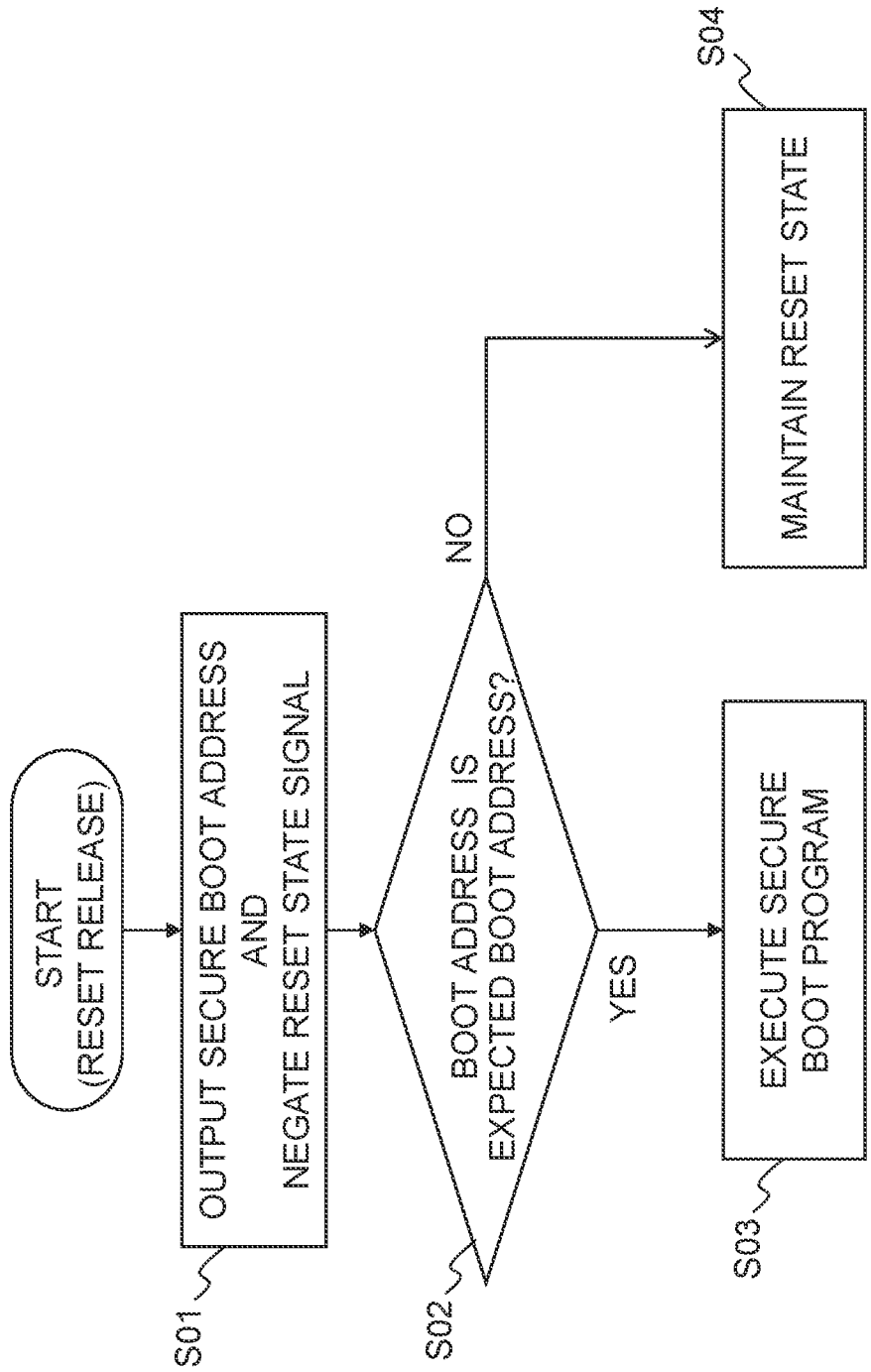
FIG. 3 is a flowchart showing the operation of the semiconductor device according to the first embodiment.

Next, referring to FIG. 3, the operation of the semiconductor device 100 after the reset release will be described. First, when the reset signal RST is negated and the reset is released, the secure boot address BTA is output to the processor module 20 (step S01). The comparison circuit 2201 is enabled in response to the negated reset signal RST. Then, the comparison circuit 2201 compares the secure boot address BTA output from the reset controller 10 with the secure boot address expected value BTA_E (step S02). If the comparison result indicates a match (YES in step S02), the address check unit 22 negates the boot address error signal ERR. Based on the negated secure boot address error signal ERR, the processor unit 21 determines that the secure boot address BTA output from the reset controller 10 has not been tampered with. In step S03, the processor unit 21 accesses the memory 30 based on the boot address BTA output from the reset controller 10. The secure boot program accessed based on the boot address BTA is executed by the processor unit 21. On the other hand, if the comparison result indicates a mismatch (NO in step S02), the address check unit 22 asserts the secure boot address error signal ERR. Based on the asserted secure boot address error signal ERR, the processor unit 21 determines that the secure boot address BTA output from the reset controller 10 has been tampered with. The processor unit 21 does not access the memory 30 and maintains the reset state (step S04).

As described above, the semiconductor device 100 according to the first embodiment includes the address check unit 22. The address check unit 22 confirms whether or not the secure boot address output from the reset controller 10 has been tampered with. That is, even if noise is intentionally injected into the semiconductor device 100 and the secure boot address output from the reset controller 10 is tampered with, it is possible to detect that the secure boot address is incorrect. When it is detected that the secure boot address output by the reset controller 10 is tampered with and an incorrect address, the processor unit 21 maintains the reset state without executing the program designated by the incorrect address. Thus, if the correct secure boot address cannot be confirmed after reset release, strong security can be realized by not executing the program.

Modified Example of First Embodiment

Figure 4:
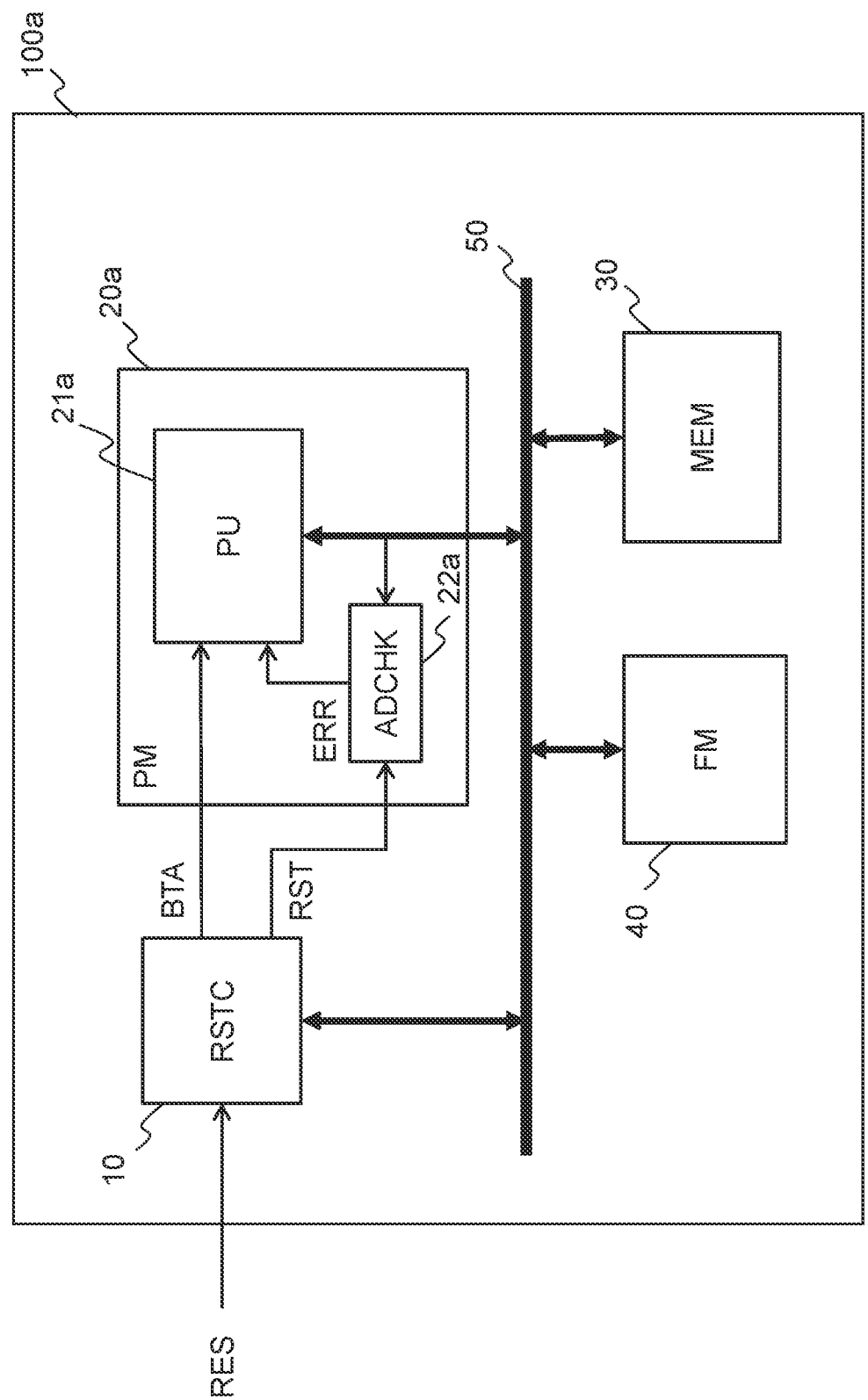
FIG. 4 is a block diagram showing a configuration example of a semiconductor device according to a modified example of the first embodiment.

Next, a modified example of the first embodiment will be described. In the first embodiment described above, the address checking unit 22 performs tampering check on the secure boot address BTA output by the reset controller 10. However, tampering check may be performed by using the secure boot address output from the processor unit 21 to the bus 50 FIG. 4 is a block diagram showing a configuration example of a semiconductor device 100*a* according to the modified example of the first embodiment. The semiconductor device 100*a* according to the modified example of the first embodiment differs from the semiconductor device 100 shown in FIG. 1 in that the processor module 20 is replaced with a processor module 20*a*. Other components may be similar to the semiconductor device 100 shown in FIG. 1. Therefore, components having the same functions as those in FIG. 1 are denoted by the same reference numerals, and descriptions thereof are omitted.

The processor module 20*a* includes a processor unit 21*a* and an address check unit 22*a*. The processor unit 21*a* generates a memory access request using the secure boot address BTA output by the reset controller 10. The memory access request includes a boot address BA based on the secure boot address BTA. The address check unit 22*a* is provided between the processor unit 21*a* and the bus 50, and checks whether or not the boot address BA included in the memory access request output to the bus 50 by the processor unit 21*a* has been tampered with. Further, the address check unit 22*a* generates a secure boot address error signal ERR in accordance with the check result and feeds it back to the processor unit 21*a*.

Figure 5:
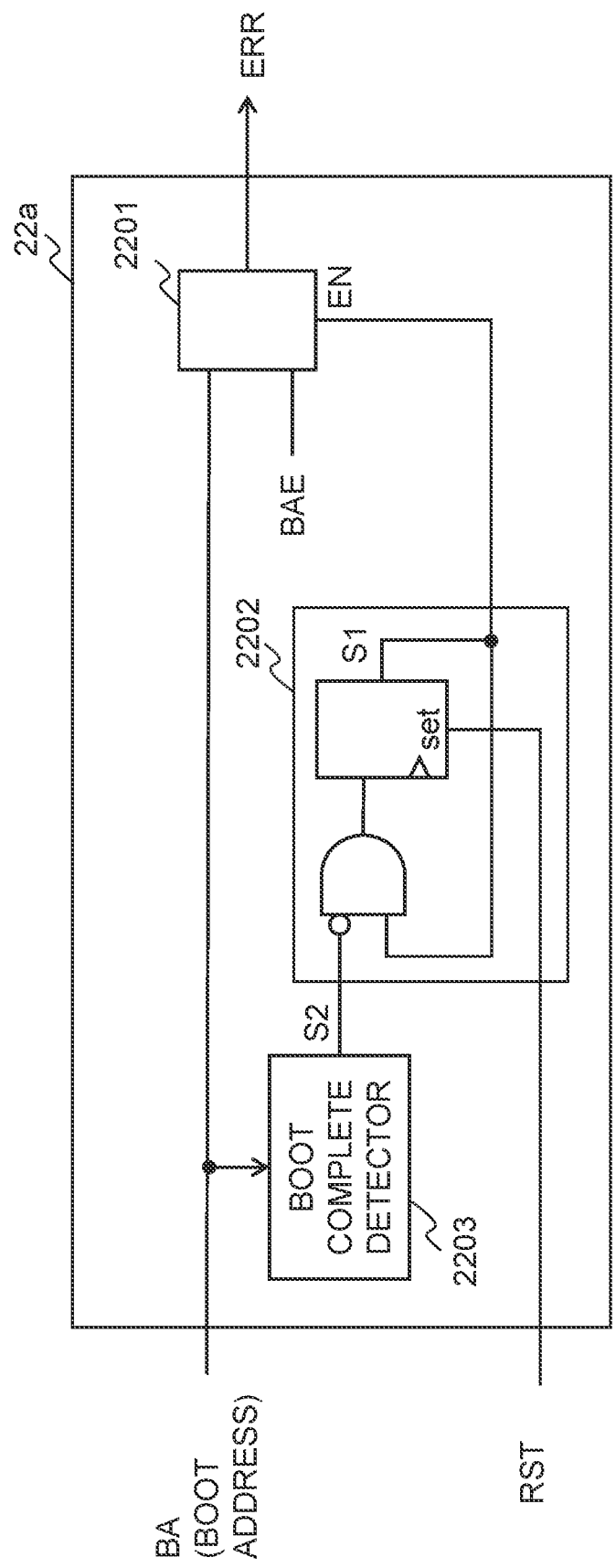
FIG. 5 is a block diagram showing a configuration example of an address check unit according to the modified example of the first embodiment.

FIG. 5 is a block diagram showing a configuration of the address checking unit 22*a*. The address check unit 21*a* includes a comparison circuit 2201, the boot-in-progress setting circuit 2202, and the boot complete detector 2203.

The boot-in-progress setting circuit 2202 outputs the boot-in-progress signal S1 after the reset signal RST is asserted until the boot operation is completed. The boot-in-progress signal S1 is set by the reset signal RST, and is reset (cleared) by the boot complete signal S2. The boot-in-progress signal S1 is supplied as an enable signal to the comparison circuit 2201.

The boot complete detector 2203 observes the boot address BA included in the first memory access request that the processor unit 21*a* first outputs after reset release and a request receiving signal (not shown) issued by the bus control unit (not shown) of the bus 50 when the memory access request is accepted, and generates the boot complete signal S2. The boot complete signal S2 is output in the cycle in which the memory access request that the processor unit 21*a* first outputs after reset release is accepted by the bus 50.

The comparison circuit 2201 compares the boot address BA included in the memory access request from the processor unit 21*a* with the secure boot address expected value BAE during the period in which the boot-in-progress signal S1 is set. Then, the comparison circuit 2201 generates the secure boot address error signal ERR based on the comparison result.

Figure 6:
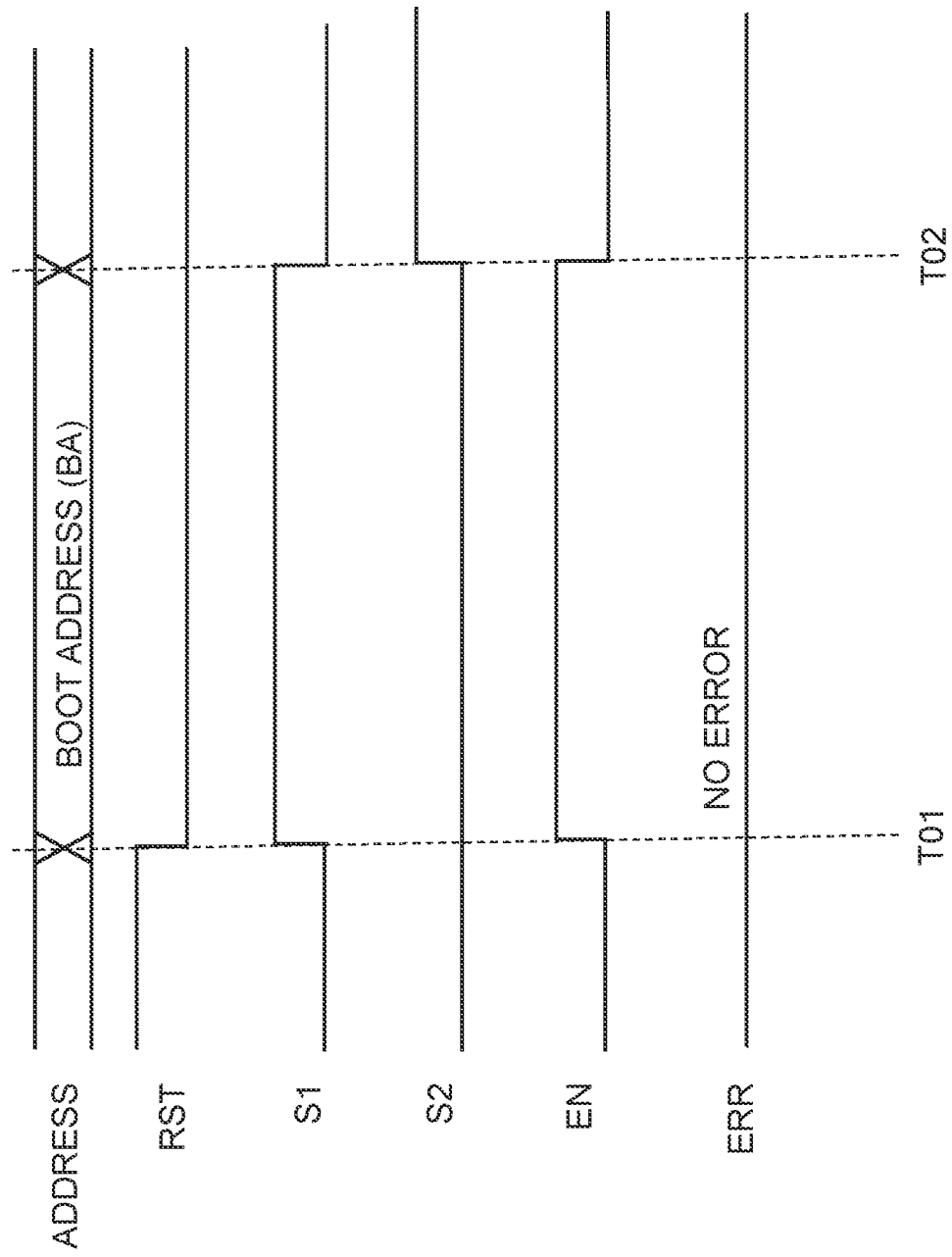
FIG. 6 is a timing chart for explaining the operation of the address check unit according to the modified example of the first embodiment.
Figure 7:
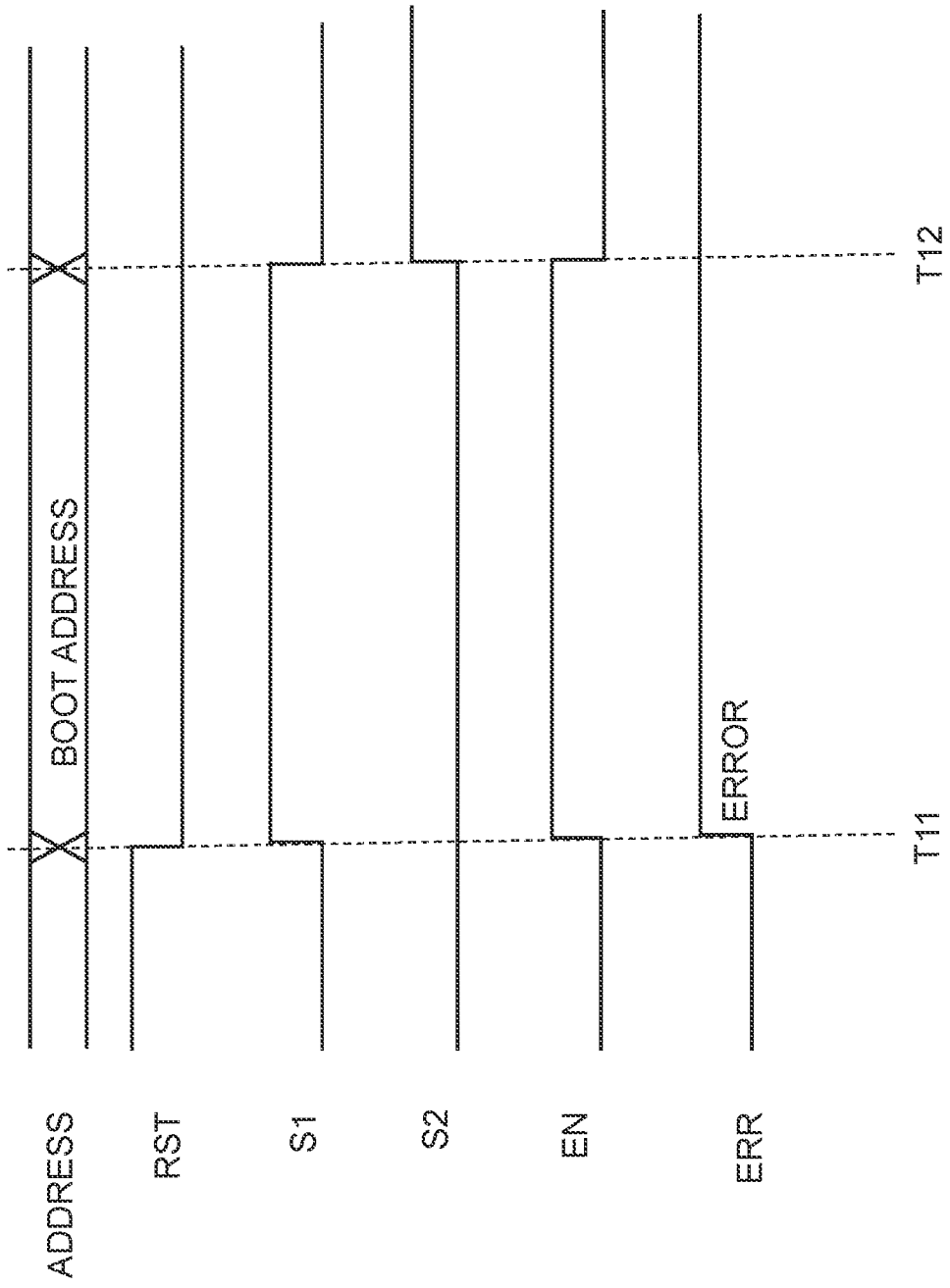
FIG. 7 is a timing chart for explaining the operation of the address check unit according to the modified example of the first embodiment.

FIGS. 6 and 7 are timing charts for explaining the operation of the address check unit 21*a* according to the present modified example. Referring to FIG. 6, an operation of the address check unit 22*a* when the boot address BA included in the memory access request from the processor unit 21*a* after the reset release has not been tampered with will be described.

When the reset corresponding to the input of the external reset signal RES is released and the reset signal RST is negated (time T01), the boot-in-progress signal S1 is set. As a result, the comparison circuit 2201 is enabled. The secure boot address BTA is transferred from the reset controller 10 to the processor module 20*a*. The processor unit 21*a* in the processor module 20*a* generates a memory access request including a boot address (BA) to the bus 50 based on the secure boot address BTA designated by the reset controller 10. The comparison circuit 2201 compares the boot address BA included in the memory access request from the processor unit 21*a* with the secure boot address expected value BAE. In FIG. 6, the comparison result indicates match and the comparison circuit 2201 negates the secure boot address error signal ERR. At time T02, the memory access request from the processor unit 21*a* is received by the bus, and the boot complete detector 2203 asserts the boot complete signal S2. The boot-in-progress signal S1 is reset (cleared) by the boot complete signal S2. Therefore, the comparison circuit 2201 is disabled, no subsequent comparison operation is performed.

Next, referring to FIG. 7, an operation of the address check unit 22*a* when the boot address BA included in the memory access request from the processor unit 21*a* after the reset release has been tampered with will be described. In FIG. 7, the boot address BA output from the processor unit 21*a* does not match the secure boot address BAE. Therefore, at time T11, the comparison circuit 2201 asserts the secure boot address error signal ERR. The other operations of the address check unit 22*a* are the same as in FIG. 6, and therefore descriptions thereof will be omitted.

The processor unit 21*a* determines whether or not to execute the secure boot program based on the secure boot address error signal ERR. When the secure boot address error signal ERR is negated, the processor unit 21*a* executes the read secure boot program. On the other hand, when the secure boot address error signal ERR is asserted, the processor unit 21*a* does not execute the read program and maintains the reset state.

According to the modified example of the first embodiment, the semiconductor device 100*a* includes the address check unit 22*a*, and can confirm whether or not the secure boot address has been tampered with in substantially the same manner as the semiconductor device 100 according to the first embodiment. Further, according to a modified example of the first embodiment, the address checking unit 22*a* checks the secure boot address included in the memory access request output by the processor unit 21*a*. Therefore, not only when noise is injected into the reset controller 10 and the secure boot address is tampered with, but also when noise is injected into the processor unit 21*a* and the secure boot address included in the memory access request is tampered with can be detected. This prevents unauthorized program execution based on an incorrect boot address and provides stronger security.

Second Embodiment

Figure 8:
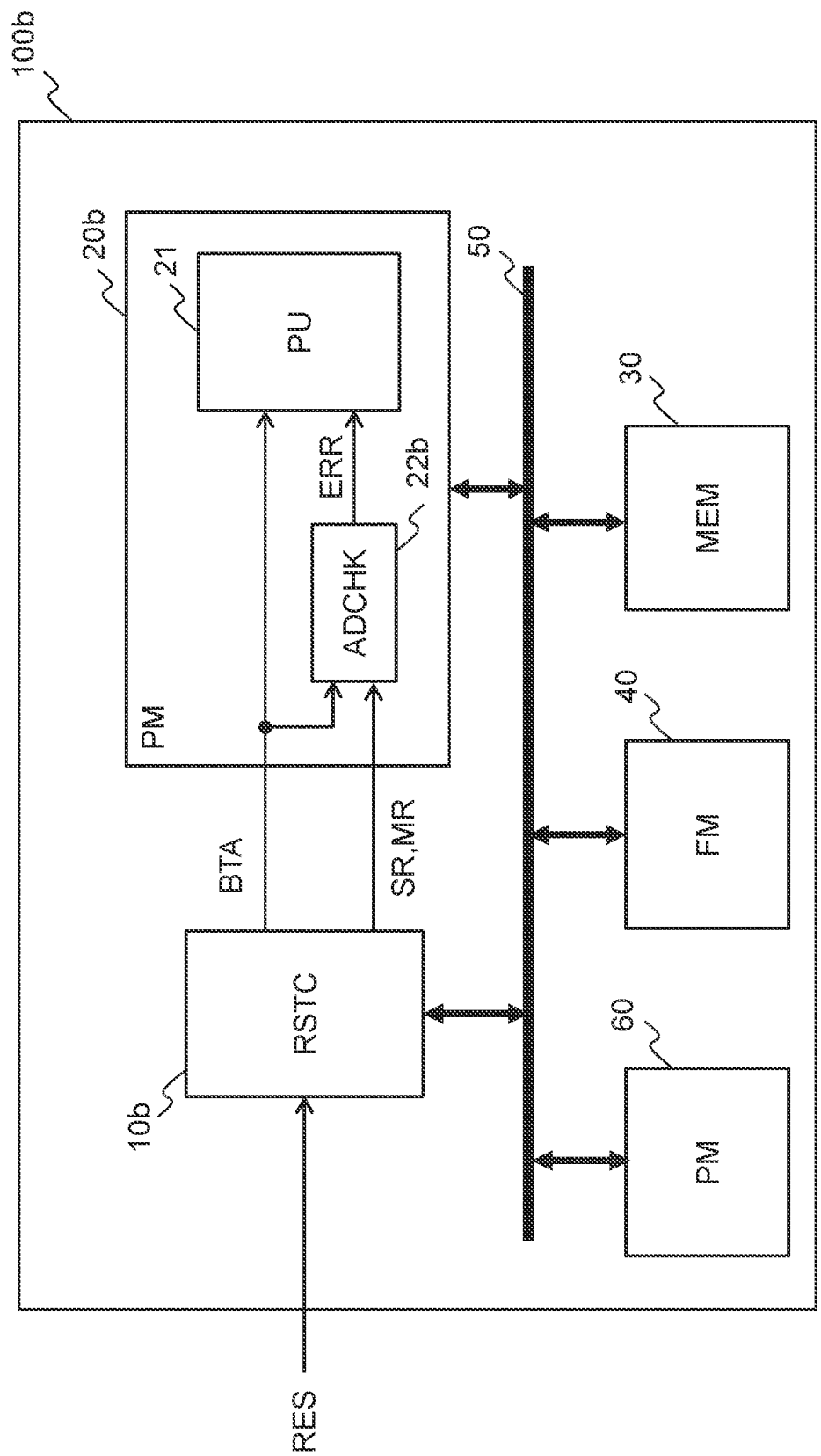
FIG. 8 is a block diagram showing a configuration example of a semiconductor device according to the second embodiment.

FIG. 8 is a block diagram showing a configuration example of the semiconductor device 100*b* according to the second embodiment. The difference between the semiconductor device 100*b* according to the second embodiment and the semiconductor device 100 according to the first embodiment shown in FIG. 1 is that the reset controller 10 and the processor module 20 are replaced with the reset controller 10*b* and the processor module 20*b*, respectively, and another processor module 60 is further added. The processor module 20*b* is different from the processor module 20 described in the first embodiment in that the address checking unit 22 is replaced with the address checking unit 22*b*. The other components and operations are the same as those of the semiconductor device 100 described in the first embodiment, and therefore the same components are denoted by the same reference numerals, and a repetitive description thereof is omitted.

In the second embodiment, the processor module 20*b* is a secure module that performs security-related operations such as secure boot and encryption processing. The processor module 20*b* is also referred to as a secure module 20*b*. On the other hand, the processor module 60 is a processor that controls the entire semiconductor device 100*b*. Although only two processor modules are shown in FIG. 8, the number of processor modules is not limited to this. The processor module 60 may also be redundant by using a plurality of processors.

Figure 9:
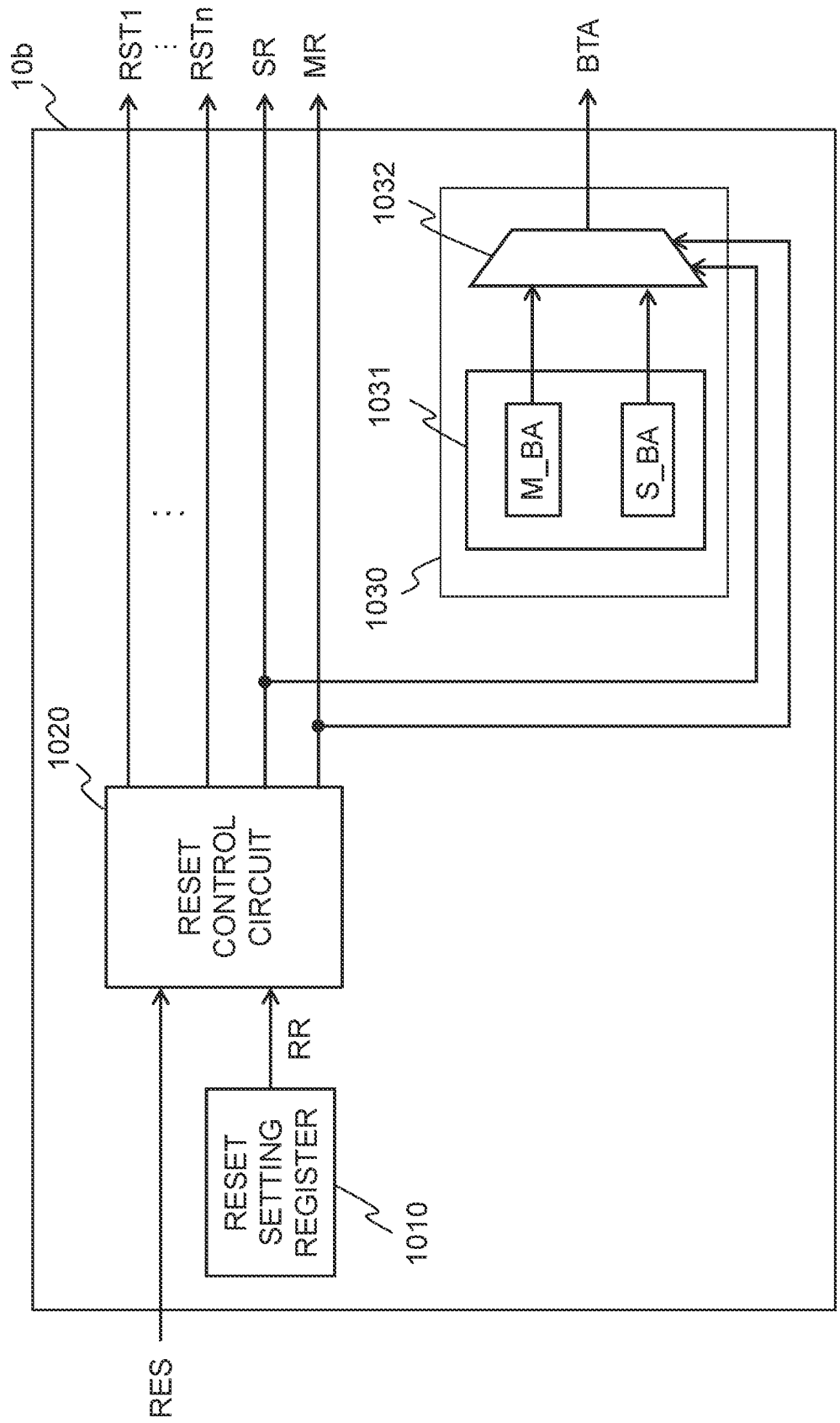
FIG. 9 is a block diagram showing a configuration example of a reset controller according to the second embodiment.

FIG. 9 is a block diagram showing a configuration example of a reset controller 10*b* according to the second embodiment. The reset controller 10*b* includes a reset setting register 1010, a reset control circuit 1020, and a boot address selection circuit 1030.

The reset setting registers 1010 is configured to be readable and writable by the processor module 60. When data is written into the reset setting register 1010, a reset request signal RR is generated. In the reset setting register 1010, at least a first data SRD1 and a second data SRD2 are written. The first data SRD1 is data for requesting a reset (system reset) of the entire semiconductor device 100*b* (semiconductor chips) and the second data SRD2 is data for requesting a reset (module reset) of a part of the modules of the semiconductor device 100*b*. Although the module to be reset target based on the second data SRD2 is not limited, in this embodiment, a case where the reset of the secure module 20*b* is requested based on the second data SRD2 will be described as an example.

The reset control circuit 1020 generates reset signals RST1-RSTn, based on a reset request such as an external reset signal RES input from the outside or a reset request signal RR. The reset signals RST1-RSTn includes reset signals supplied to the respective internal modules of the semiconductor device 100*b*, such as the secure module 20*b*, the processor module 50, the memory 30, and the functional module 40. The reset control circuit 1020 instructs the reset by asserting the reset signals RST1-RSTn, and releases the reset by negating.

Further, the reset control circuit 1020 identifies whether the reset requested based on the external reset signal RES or the reset request signal RR is system reset or module reset, and generates a system reset identification signal SR or a module reset identification signal MR. The system reset may be regarded as a first reset, and the module reset as a second reset. Further, the system reset identification signal SR may be regarded as a first reset identification signal, and the module reset identification signal may be regarded as a second reset identification signal.

For example, when the external reset signal RES is inputted or when the first data SRD1 is written in the reset setting register 1010, the reset control circuit 1020 instructs the system reset. In this instance, the reset control circuit 1020 asserts all the reset signals RST1-RSTn and generates the system reset identification signal SR. On the other hand, when the second data SRD2 is written in the reset setting register 1010, the reset control circuit 1020 asserts the reset signal for the secure module 20*b* and generates the module reset identification signal MR in order to instruct the module reset. Incidentally, the system reset identification signal SR and the module reset identification signal MR are negated at the time of reset release.

The boot address selection circuit 1030 includes an address register 1031 and a selection circuit 1032.

The address register 1031 holds the secure boot address S_BA (first boot address) and the secure boot address M_BA (second boot address). The secure boot address S_BA is the start address of the secure boot program to be executed when the system reset is released. The secure boot address M_BA is the start address of the secure boot program that is executed when the module reset is released, and is different from the secure boot address S_BA.

The start address for the secure boot program executed at the time of system reset release is predetermined. Therefore, the secure boot address S_BA cannot be changed by the user. On the other hand, after the reset of the processor module 20*b* that is the reset target of the module reset is released, it is sufficient to confirm the authentication of the program executed by the processor module 20*b*. Therefore, the contents of the secure boot program executed at the time of module reset release are set by the user unlike the secure boot program executed at the time of system reset release. The secure boot program executed at the time of module reset release is then stored by the user in a predetermined area of the memory. Therefore, the secure boot address M_BA is not a fixed address and can be set by the user.

The selection circuit 1032 selects the secure boot address held in the address register 1031 based on the system reset identification signal SR and the module reset identification signal MR. For example, when the system reset identification signal SR once asserted is negated, the selection circuit 1032 selects the secure boot address S_BA and outputs it as the secure boot address BTA. The selection circuit 1032 selects and outputs the secure boot address M_BA as the secure boot address BTA when the module reset identification signal MR once asserted is negated.

Figure 10:
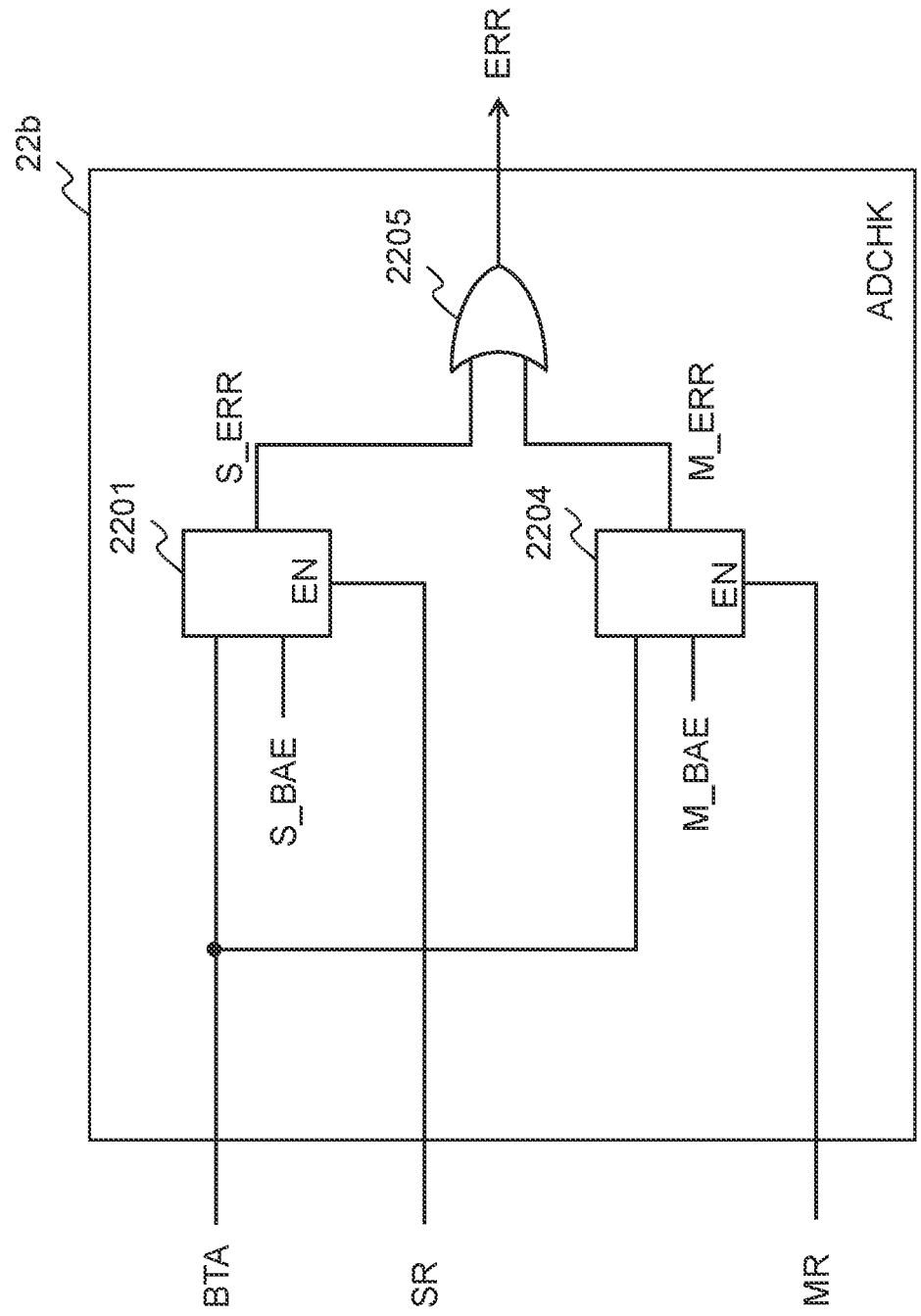
FIG. 10 is a block diagram showing a configuration example of an address check unit according to the second embodiment.

Next, the address check unit 22*b* according to the present embodiment will be described with reference to FIG. 10. FIG. 10 is a block diagram showing an example of the configuration of the address checking unit 22*b*. The address check unit 22*b* includes comparison circuits 2201, 2204 and an OR circuit 2205. The address check unit 22*b* confirms the validity of the secure boot address BTA from the reset controller 10*b*, and outputs the confirmation result as a boot address error signal ERR. In this way, the secure boot address is selected based on type of reset.

The comparison circuit 2201, when the system reset is released and the system reset identification signal SR is negated, become enable state. The comparison circuit 2201 in enable state compares the secure boot address BTA output from the reset controller 10*b* with the secure boot address expected value S_BAE. The secure boot address expected value S_BAE is the expected value of the start address of the secure boot program to be executed after the system reset is released. Then, the comparison circuit 2201 asserts or negates the boot address error signal S_ERR based on the comparison result.

The comparison circuit 2204, when the module reset is released and the module reset identification signal MR is negated, becomes enable state. The comparison circuit 2204 in the enabled state compares the secure boot address BTA output from the reset controller 10*b* with the secure boot address expected value M_BAE. The expected secure boot address M_BAE is the expected value of the start address of the secure boot program after the module reset is released. Then, the comparison circuit 2204 asserts or negates the boot address error signal M_ERR based on the comparison result.

As described above, the start address of the secure boot program executed after the system reset release is predetermined. Accordingly, the comparison circuit 2201 determines whether or not all bits of the boot address BTA from the reset controller 10*b* exactly match all bits of the secure boot address expected value S_BAE. On the other hand, since the secure boot program after the module reset release is allocated by the user in a predetermined area of the memory 30, it may be determined whether or not the boot address BTA from the reset controller 10b is present in a predetermined area of the memory 30. Therefore, the comparison circuit 2204 compares the high-order bit data of the boot address BTA with the high-order bit data of the secure boot address expected value M_BAE.

The OR circuit 2205 receives the boot address error signals S_ERR and M_ERR, and outputs the secure boot address error signal ERR to the processor unit 21 of the processor module 20b. The secure boot address error signal ERR is asserted if the secure boot address issued after the system reset release or the module reset release is a tampered with and is incorrect address.

Figure 11:
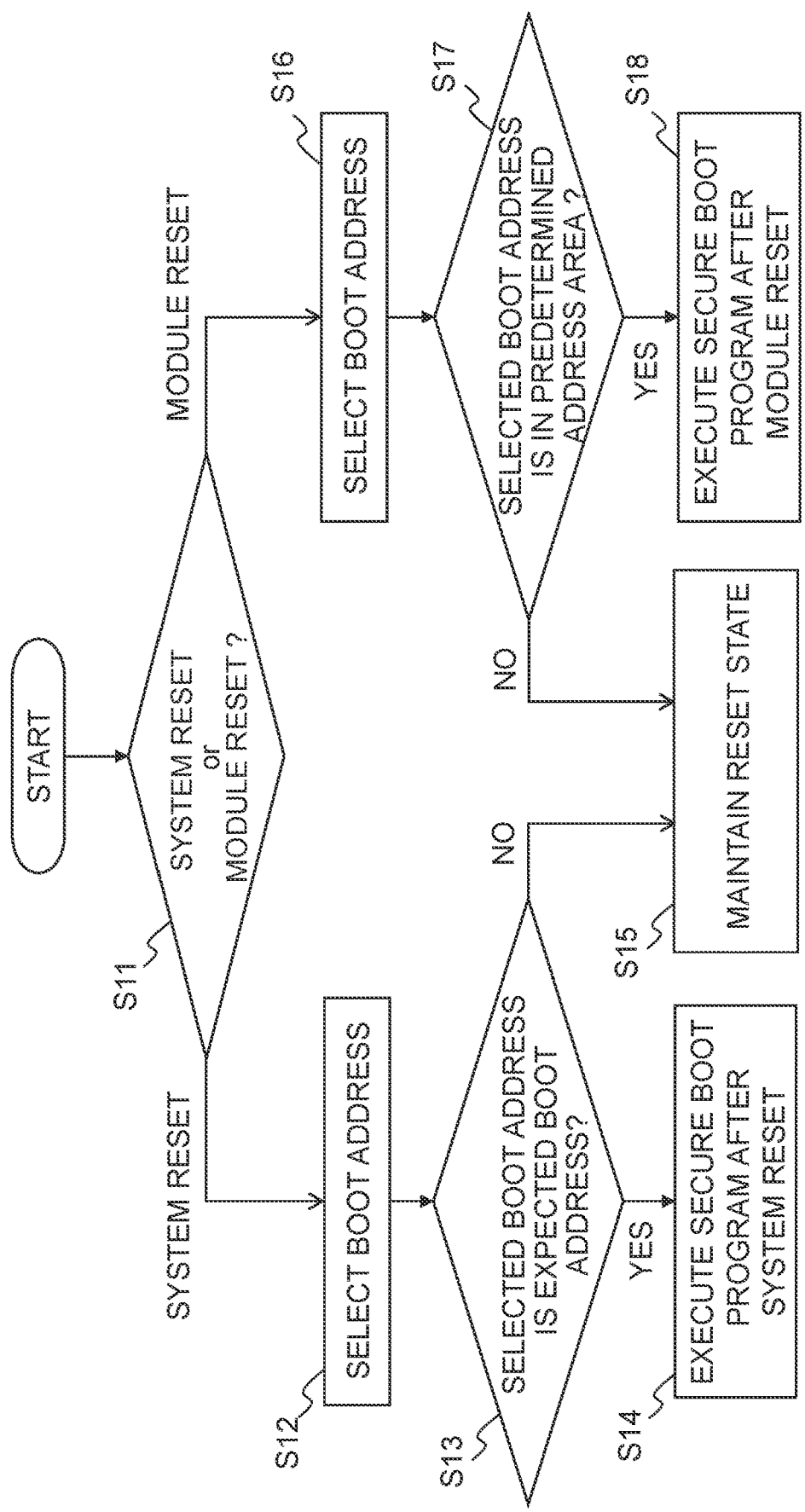
FIG. 11 is a flowchart showing the operation of the semiconductor device according to the second embodiment.

Referring to FIG. 11, the operation of the semiconductor device 100b after the reset release will be described. First, the reset control circuit 1020 identifies whether the reset requested based on the external reset signal RES or reset request signal RR is a system reset or a module reset (step S11). When the requested reset is a system reset, the boot address selection circuit 1030 selects the secure boot address S_BA based on the system reset identification signal SR after the system reset release, and outputs the selected secure boot address S_BA as the boot address BTA (step S12). In step S13, the comparison circuit 2201 of the address check unit 22b is enabled based on the system reset identification signal SR, and compares the boot address BTA with the secure boot address expected value S_BAE. If the boot address BTA matches the secure boot address expected value S_BAE (YES in step S13), it is determined that the boot address BTA output from the reset controller 10b is correct. The processor unit 21 accesses the memory 30 based on the boot address BTA, and reads and executes the secure boot program to be executed after the system reset is released (step S14). On the other hand, if the boot address BTA does not match the secure boot address expected value S_BAE (NO in step S13), the boot address error signal S_ERR is asserted, and as a result, the secure boot address error signal ERR is asserted. Therefore, the processor unit 21 does not access the memory 30 and maintains the system reset state (step S15).

Similarly, when the requested reset is a module reset, the boot address selection circuit 1030 selects the secure boot address M_BA based on the module reset identification signal MR after the module reset release, and outputs the selected secure boot address M_BA as the boot address BTA (step S16). The comparison circuit 2204 of the address check unit 22b is in enable state based on the module reset identification signal MR, compares the high-order bit data of the boot address BTA with the high-order bit data of the secure boot address M_BA to be executed after the module reset release. Then, the comparison circuit 2204 determines whether or not the boot address BTA is within a predetermined address region (step S17). If the higher-order bit data of the boot address BTA matches the high-order bit data of the secure boot address M_BA (YES in step S17), the boot address BTA output from the reset controller 10b is determined to be correct. In step S18, the processor unit 21 accesses the memory 30 based on the boot address BTA determined to be correct, reads and executes the secure boot program to be executed after the module reset is released. On the other hand, if the high-order bit data of the boot address BTA does not match the high-order bit data of the secure boot address M_BA (NO in step S17), the boot address error signal M_ERR is asserted, and as a result, the secure boot address error signal ERR is asserted. Therefore, the processor unit 21 does not access the memory 30 and maintains the module reset state (step S15).

As described above, according to the second embodiment, since the address checking unit 22b is provided, the tampering check of the boot address specified by the reset controller 10b after the reset is released can be performed. Further, according to the second embodiment, the reset controller 10b generates a reset identification signal, and the address check unit 22b switches the expected value of the secure boot address according to the reset identification signal. Therefore, the semiconductor device having not only a system reset function but also a module reset function can perform tampering check of the secure boot addresses specified after the system reset release and after the module reset release, and execute the correct secure boot program corresponding to the requested reset.

Further, according to the second embodiment, when it is detected in that the boot address designated by the reset controller 10b after the system reset release or after the module reset release is tampered with, the processor unit 21 maintains the reset state without starting the program based on the boot address designated by the reset controller 10b. This prevents the execution of the program specified by the false boot address and provides storing security.

Modified Example of Second Embodiment

Figure 12:
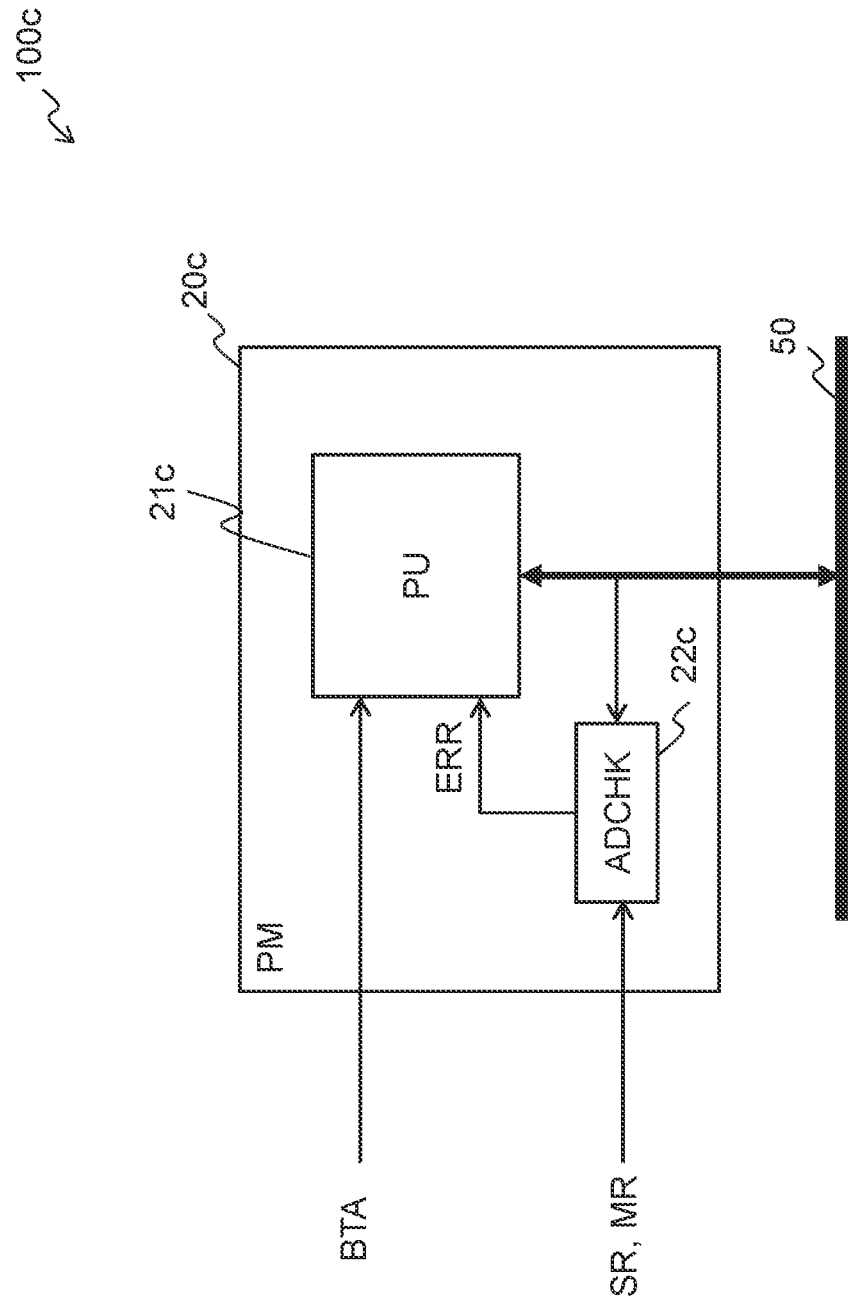
FIG. 12 is a block diagram showing a configuration example of a processor module according to a modified example of the second embodiment.

Next, a modified example of the second embodiment will be described. In the second embodiment described above, as in the modified example of the first embodiment, the secure boot address included in the memory access request output from the processor module 20b to the bus may be checked. FIG. 12 is a block diagram showing a configuration example of a processor module 20c (secure module 20c) of a semiconductor device 100c according to the modified example of the second embodiment.

The processor module (secure module) 20c includes a processor unit 21c and an address check unit 22c. The processor unit 21c performs memory access using the secure boot address BTA designated by the reset controller 10b. The address check unit 22c checks whether or not the address included in the memory access request output to the bus 50 from the processor unit 21c has been tampered with. Then, the address check unit 22c generates a secure boot address error signal ERR based on the check result, and feeds back the signal ERR to the processor unit 21c.

Figure 13:
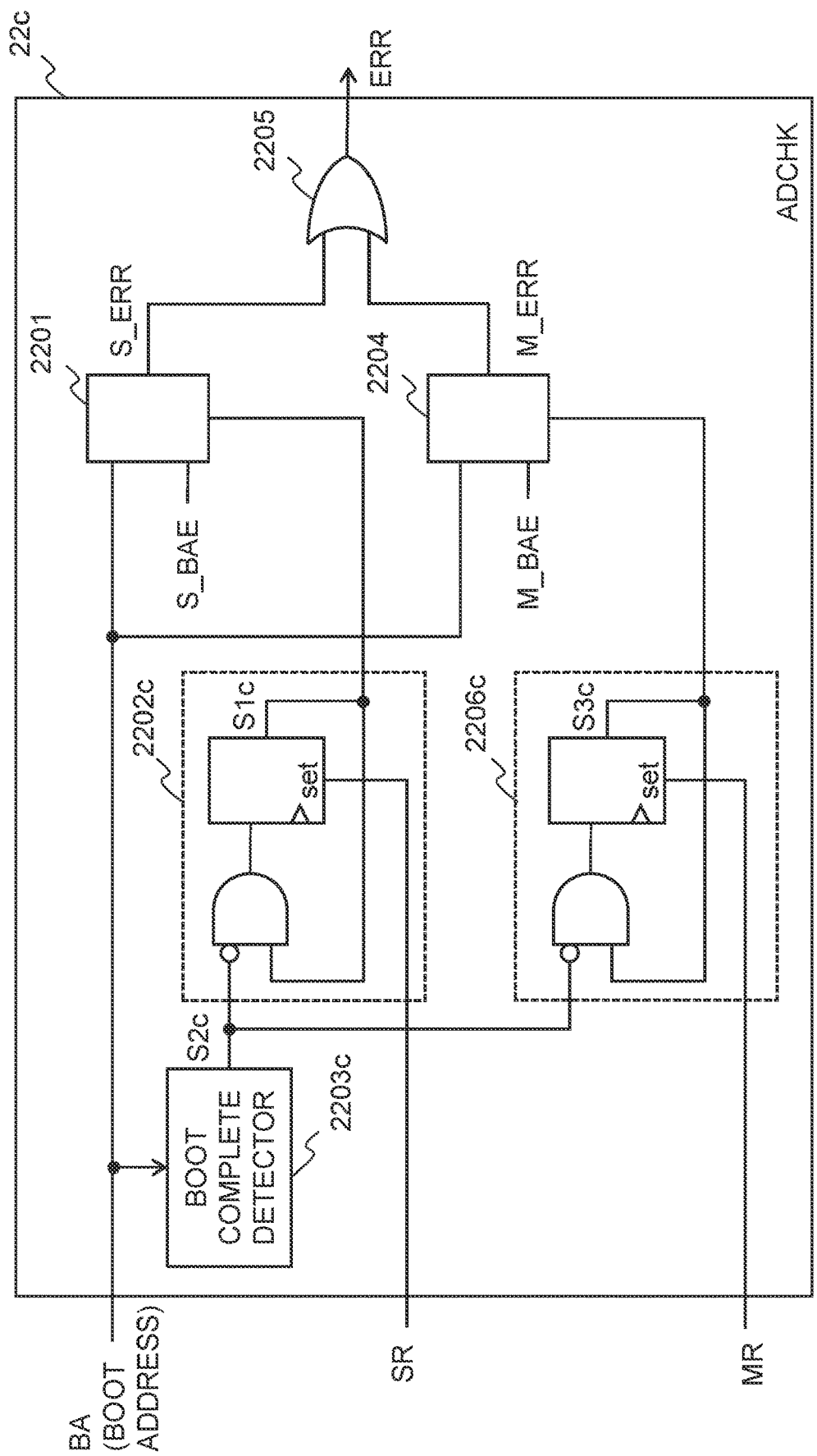
FIG. 13 is a block diagram showing a configuration example of the address check unit according to the modified example of the second embodiment.

FIG. 13 is a block diagram showing a configuration example of the address check unit 22c. Compared to the the address check unit 22b of the second embodiment, the address check unit 22c further includes boot-in-progress setting circuits 2202c and 2206c and a boot complete detector 2203c. Since the other components and operations are the same as those of the address check unit 22b of FIG. 10 described in Embodiment 2, the same components are denoted by the same reference numerals, and a repetitive description thereof is omitted.

The boot-in-progress setting circuits 2202c and 2206c have the same configuration and function as the boot-in-progress setting circuit 2202 of the modified example of the first embodiment shown in FIG. 5. The boot-in-progress setting circuits 2202c and 2206c are set by the system reset identification signal SR and the module reset identification signal MR, respectively. Both of the boot-in-progress setting circuits 2202c and 2206c are reset (cleared) by the boot complete signal S2c. That is, the boot-in-progress signal S1c is output after the system reset identification signal SR is asserted until the boot processing is completed. The bootin-progress signal S3c is output after the module reset identification signal MR is asserted until the boot process is completed.

The boot complete detector 2203c is the same as the boot complete detector 2203 of the modified example of the first embodiment described above. The boot complete detector 2203c observes the boot address BA included in the memory access request output by the processor unit 21c after the system reset release or after the module reset release and an request receiving signal (not shown) from the bus 50, and generates the boot complete signal S2c.

The comparison circuits 2201 and 2204 are in enable state based on the boot-in-progress signal S1c, S3c, respectively. The comparison circuit 2201 which is enabled based on the system reset release compares the boot address (BA) included in the memory access request output by the processor unit 21c with the secure boot address expected value S_BAE of the secure boot program executed after the system reset. In addition, the comparison circuit 2204 that is enabled based on the module reset release compares the boot address (BA) included in the memory access request output by the processor unit 21c with the secure boot address expected value M_BAE of the secure boot program executed after the module reset.

Therefore, according to the modified example of the second embodiment, as in the second embodiment, it is possible to detect whether or not the secure boot address specified after the system reset and the module reset has been tampered with. Moreover, according to the modified example of the second embodiment, by providing the boot-in-progress setting circuits 2202c and 2206c and the boot complete detector 2203c, it is possible to perform a tampering check of the address of the memory access request that is output first after the reset is released. This can detect that the secure boot address not only in the reset controller 10b but also in the processor module 20c has been tampered with.

Third Embodiment

Figure 14:
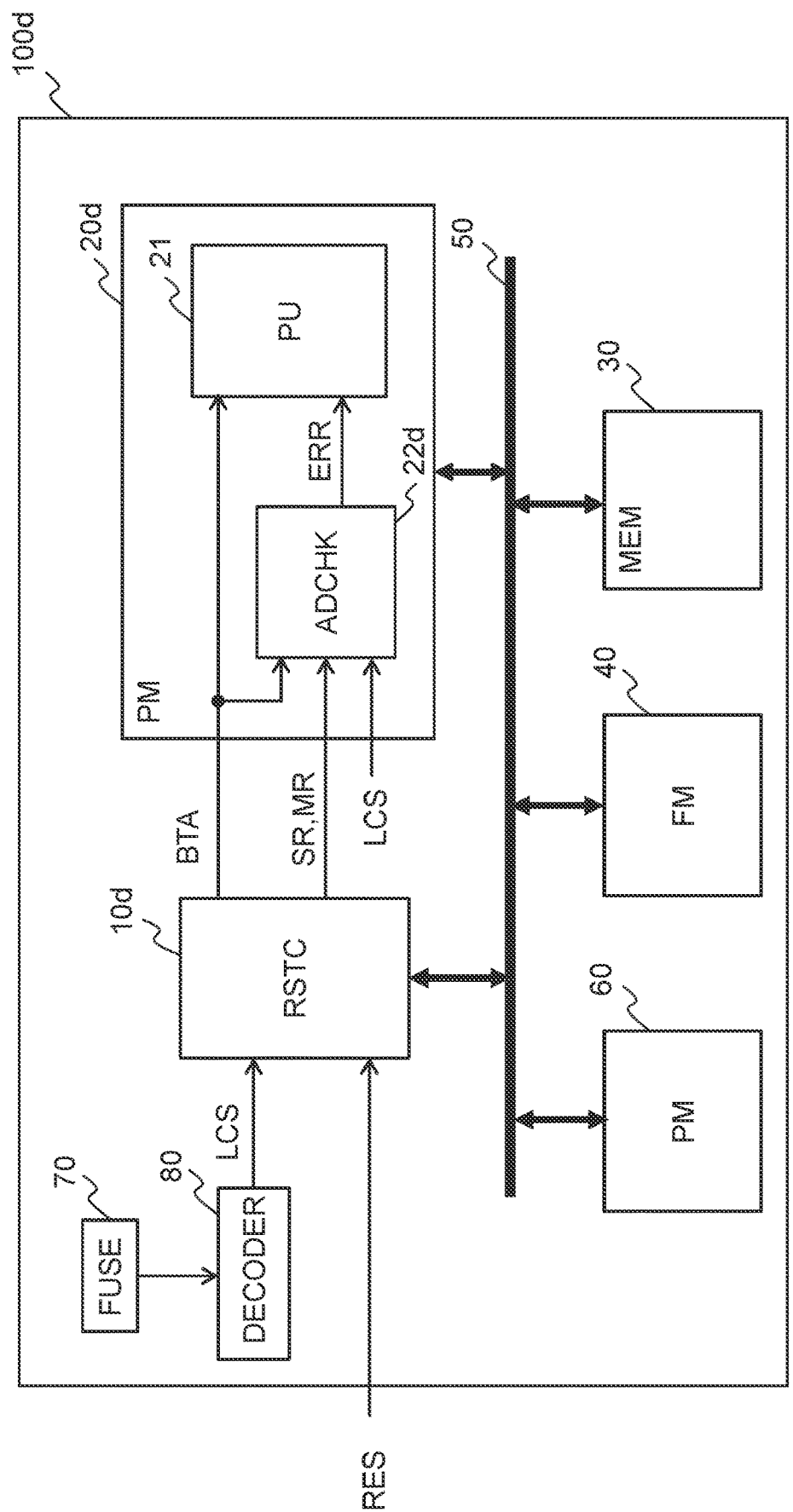
FIG. 14 is a block diagram showing a configuration example of a semiconductor device according to the third embodiment.

Next, third embodiment will be described. FIG. 14 is a block diagram showing a configuration example of the semiconductor device 100d according to the third embodiment. The difference between the semiconductor device 100d according to the third embodiment and the semiconductor device 100b according to the second embodiment shown in FIG. 8 is that the reset controller 10b and the address check unit 22b are replaced with the reset controller 10d and the address check unit 22d, respectively, and a fuse module 70 and a decoder 80 are added. The other components and functions thereof are the same as those of the semiconductor device 100b described in the second embodiment, and therefore, the same components are denoted by the same reference numerals, and repetitive descriptions thereof are omitted.

The fuse module 70 has an electrically writable electrical fuse. In the fuse module 70, life cycle state information indicating a state of the semiconductor device 100d such as a customer shipment state or a debug mode state is written by a device manufacturer or an evaluator of the semiconductor device 100d.

When the system reset is released, the decoder 80 fetches the life cycle state information stored in the fuse module 70, and generates the life cycle state signal LCS based on the fetched life cycle state information. The life cycle state signal LCS includes a secure boot flag bit indicating a secure boot valid state. For example, when the life cycle state information indicates the customer shipment state, the decoder 80 generates the life cycle state signal LCS indicating the normal operation mode. At this time, the secure boot flag bit included in the lifecycle state signal LCS is set to indicate that secure boot is valid. For example, the secure boot flag bit is set to "1". When the life cycle state information indicates a debug state, the life cycle state signal LCS indicating a debug mode is generated. At this time, the secure boot flag bit included in the life cycle state signal LCS is set to indicate that secure boot is invalid. For example, the secure boot flag bit is set to "0".

Figure 15:
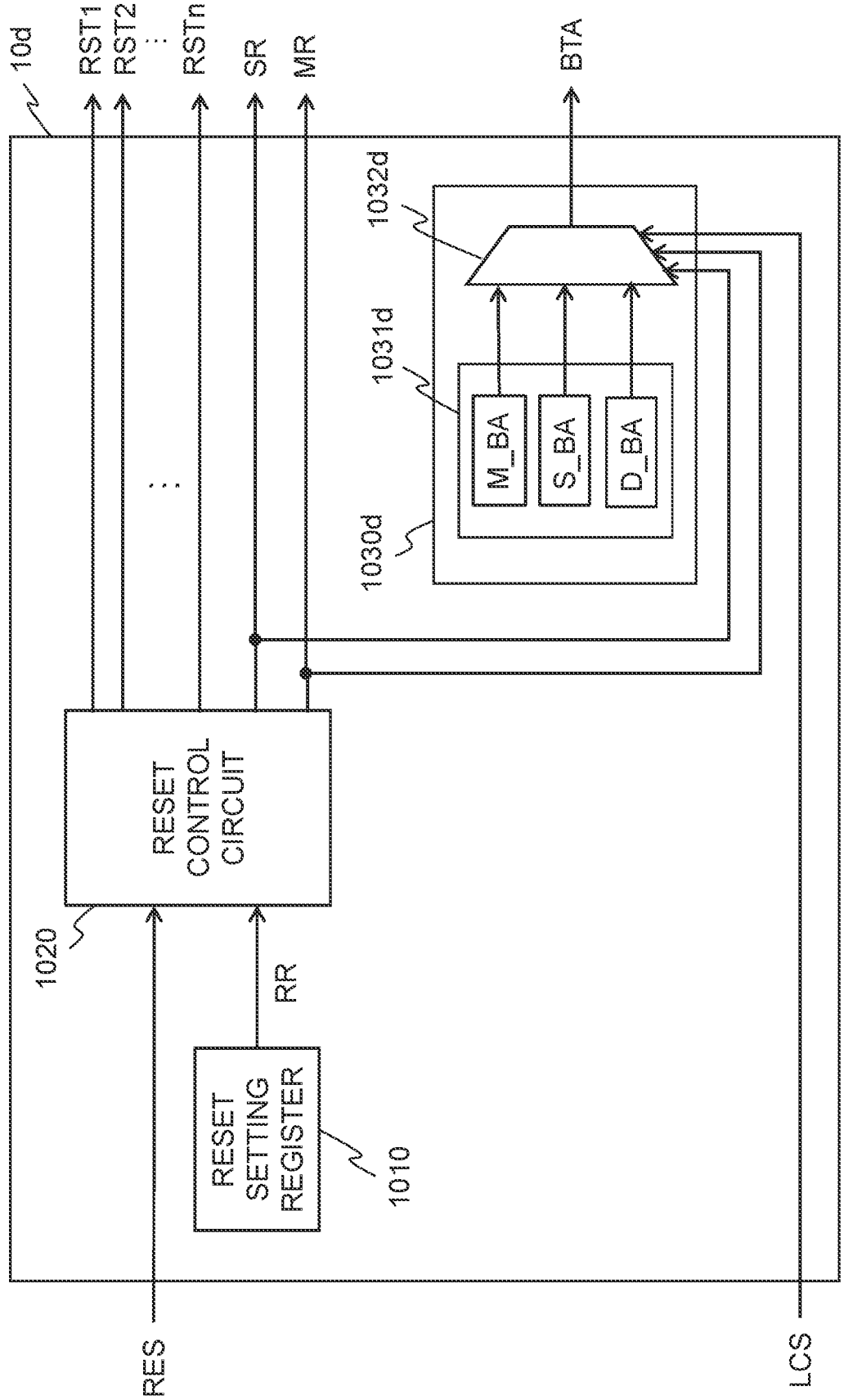
FIG. 15 is a block diagram showing a configuration example of a reset controller according to the third embodiment.

FIG. 15 is a block diagram showing a configuration example of a reset controller 10d according to the third embodiment. The reset controller 10d differs from the reset controller 10b of the second embodiment shown in FIG. 9 in that the address selection circuit 1030 is replaced with an address selection circuit 1030d. The address selection circuit 1030d includes an address register 1031d and a selection circuit 1032d.

The address register 1031d holds the start address information of the boot program other than the secure boot program in addition to the start address information of the secure boot program executed after the system reset release and the secure boot program executed after the module reset release. That is, the address register 1031d holds the boot address D_BA (third boot address) in addition to the secure boot address S_BA (first boot address) and the secure boot address M_BA (second boot address). The boot address D_BA is used, for example, in debug mode.

The selection circuit 1032d selects the boot address held in the address register 1031d based on the system reset identification signal SR, the module reset identification signal MR output from the reset control circuit 1020 or the life cycle state signal LCS generated by the decoder 80. When the secure boot flag bit of the life cycle state signal LCS is "1", that is, when the secure boot is valid, the selection circuit 1032d selects the secure boot address S_BA or the secure boot address M_BA based on the system reset identification signal SR or the module reset identification signal MR. When the secure boot flag bit of the life cycle state signal LCS is "0", that is, when the secure boot is invalid, the selection circuit 1032d selects the boot address D_BA in accordance with the system reset identification signal SR.

Figure 16:
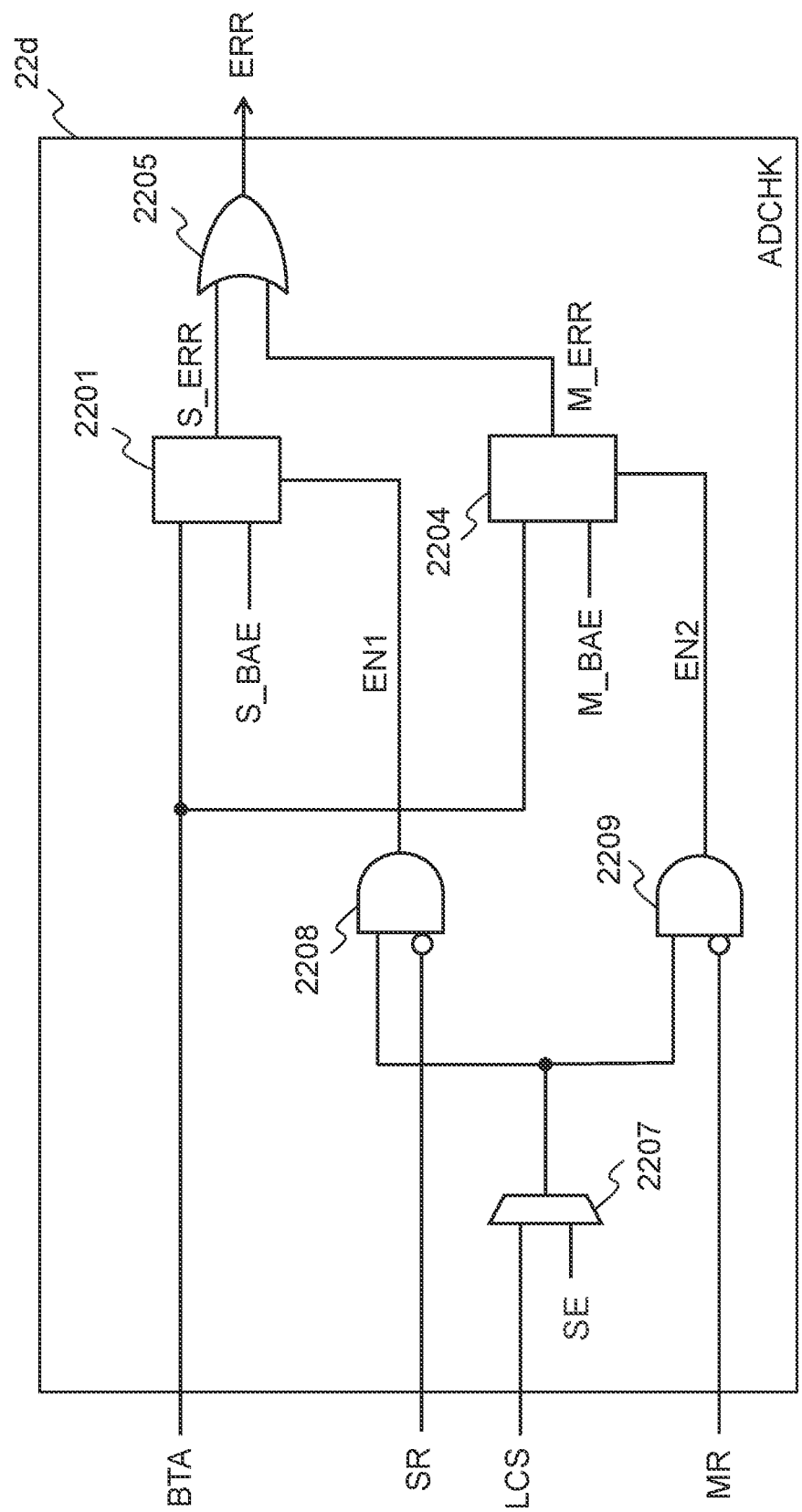
FIG. 16 is a block diagram showing a configuration example of an address check unit according to the third embodiment.

FIG. 16 is a block diagram showing a configuration example of the address check unit 22d according to the third embodiment. The address check unit 22d differ from the address check unit 22b of the second embodiment shown in FIG. 10 in that the life cycle state determination unit 2207, and the enable signal generating circuit 2208 and 2209 are added. Other components are the same as the address check unit 22b described in the second embodiment shown in FIG. 10, therefore the same reference numerals are given to the same configuration, description thereof will be omitted.

The life cycle state determination unit 2207 compares the life cycle state signal LCS with the secure boot valid data SE indicating that the secure boot is valid in order to determine whether the secure boot by the life cycle state signal LCS is valid or invalid. That is, the life cycle state determination unit 2207 determines whether or not the secure boot flag bit of the life cycle state signal LCS is "1". When it is determined that the secure boot is valid based on the life cycle state signal LCS, the life cycle state determination unit 2207 outputs "1". On the other hand, when it is determined that the secure boot is invalid, the life cycle state determination unit 2207 outputs "0".

The enable signal generating circuits 2208 and 2209 generate enable signals EN1, EN2 for the comparison circuits 2201 and 2204, respectively. The enable signal generating circuit 2208 generates the enable signal EN1 for the comparison circuit 2201 based on the determination result of the life cycle state determination unit 2207 and the system reset identification signal SR. Similarly, the enable signal generating circuit 2209 generates the enable signal EN2 for the comparison circuit 2202 based on the determination result of the life cycle state determination unit 2207 and the module reset identification signal MR. For example, the enable signal generating circuits 2208, 2209 include, for example, an AND circuit. The enable signal generating circuits 2208, 2209 generates enable signals EN1, EN2 based on the determination result by the life cycle state determination unit 2207, when the corresponding reset identification signal is negated, i.e., the reset is released.

If secure boot is valid, enable signal generating circuit 2208 asserts the enable signal EN1 in response to system reset identification signal SR. Therefore, the comparison circuit 2201 is enabled. Further, the enable signal generating circuit 2209, in response to the module reset identification signal MR, asserts the enable signal EN2 for the comparison circuit 2204. Therefore, the comparison circuit 2204 is enabled. That is, if secure boot is valid, a tampering check of the secure boot address is performed.

On the other hand, when the secure boot is invalid, the enable signal generating circuits 2208 and 2209 do not assert the enable signals EN1, EN2 regardless of the corresponding reset identification signal. That is, the comparison circuits 2001 and 2204 are disabled, and the tampering check of the secure boot address BTA output from the reset controller 10b is not performed. In this manner, the life cycle state signal LCS can be regarded as a tampering check necessity signal of the secure boot address.

Figure 17:
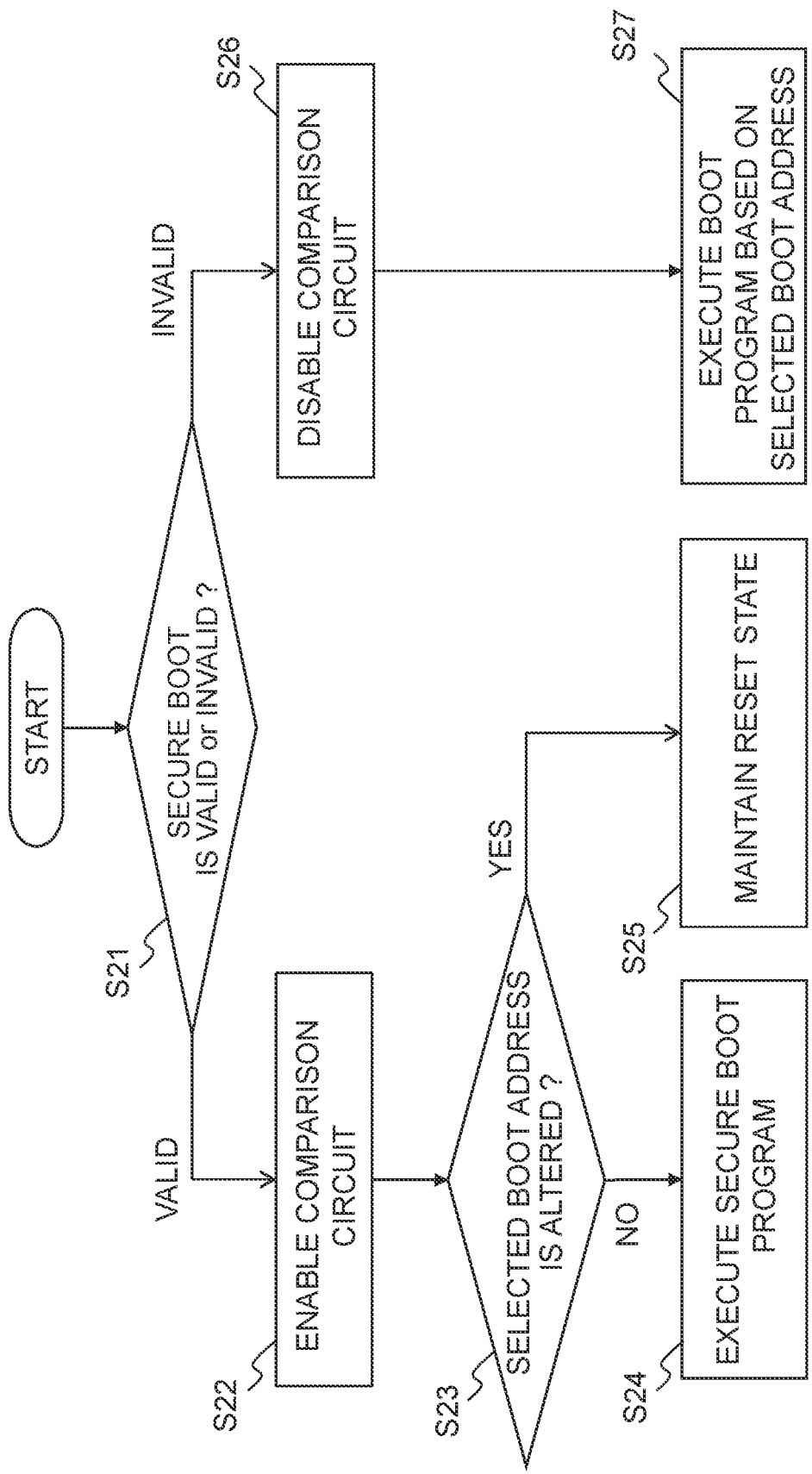
FIG. 17 is a flowchart illustrating the operation of the processor module according to the third embodiment.

FIG. 17 is a flow of operation of the processor module 20d in the third embodiment. First, the life cycle state determination unit 2207 of the address check unit 22d determines whether the secure boot is valid or invalid based on the life cycle state signal LCS (step S21). When the secure boot is valid, the comparison circuit 2201 or the comparison circuit 2204 is enabled in response to the reset identification signal (step S22). The enabled comparison circuit 2201 or 2204 compares the secure boot address BTA output from the reset controller 10d with the corresponding expected value, and confirms whether or not the secure boot address BTA output from the reset controller 10d has been tampered with (step S23). If the secure boot address BTA has not been tampered with (NO in step S23), the processor unit 21 reads and executes the secure boot program based on the secure boot address BTA output from the reset controller 10d. Meanwhile, when it is detected that the secure boot address BTA has been tampered with, the processor unit 21 maintains the reset state (step S25).

On the other hand, when the secure boot is invalid, the comparison circuits 2201 and 2204 are disabled (step S26). Therefore, the tampering check of the boot address BTA output from the reset controller 10d is not performed, and the processor unit 21 reads and executes the program based on the boot address BTA (step S27).

As described above, the third embodiment has the address check section 22d for tampering check of the secure boot address, so that the effect similar to that of the second embodiment can be obtained. Further, based on the life cycle state information set in the fuse module 70, it controls whether or not the tampering check of the boot address output from the reset controller 10b is performed. Thus, in the debug mode, the boot processing from any address can be executed, and the debugging efficiency can be improved.

Modified Example of the Third Embodiment

Figure 18:
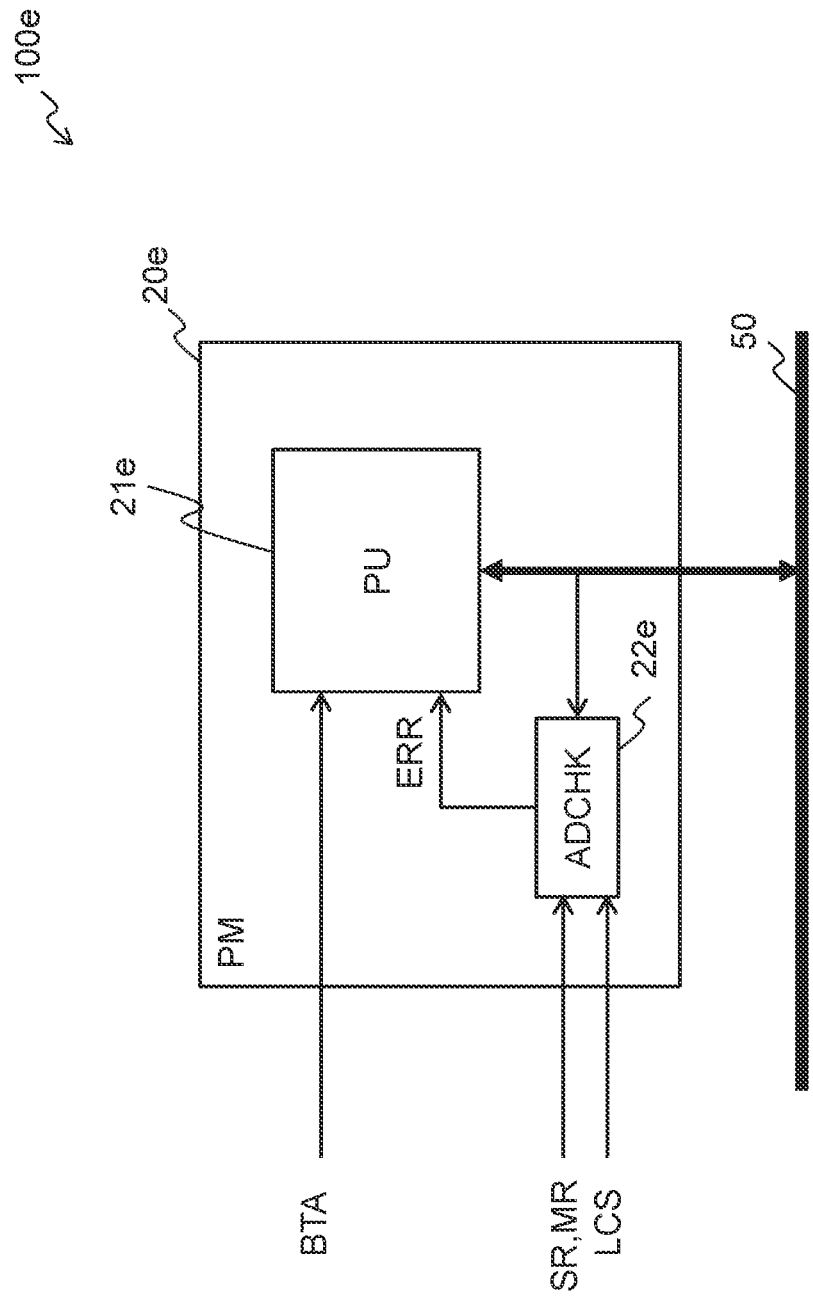
FIG. 18 is a block diagram showing a configuration example of a processor module according to a modified example of the third embodiment.

In the third embodiment described above, as in the modified example of the second embodiment, the tampering check may be performed using the secure boot address included in the memory access request output from the processor module 20b to the bus 50. FIG. 18 is a block diagram showing a configuration example of a processor module 20e (secure module 20e) of a semiconductor device 100e according to a modified example of the third embodiment.

The processor module 20e includes a processor unit 21e and an address check unit 22e. The processor unit 21e generates a memory access request based on the secure boot address BTA output from the reset controller. When the life cycle state signal LCS indicates that the secure boot is enable, the address check unit 22e checks whether or not the secure boot address included in the memory access request generated by the processor unit 21e has been tampered with. Then, the address check unit 22e generates a secure boot address error signal ERR based on the check result, and feeds back the signal ERR to the processor unit 21e. On the other hand, if the life cycle state signal LCS indicates that secure boot is disabled, no address tampering check is performed, and a program based on the boot address output from the reset controller is read and executed.

Figure 19:
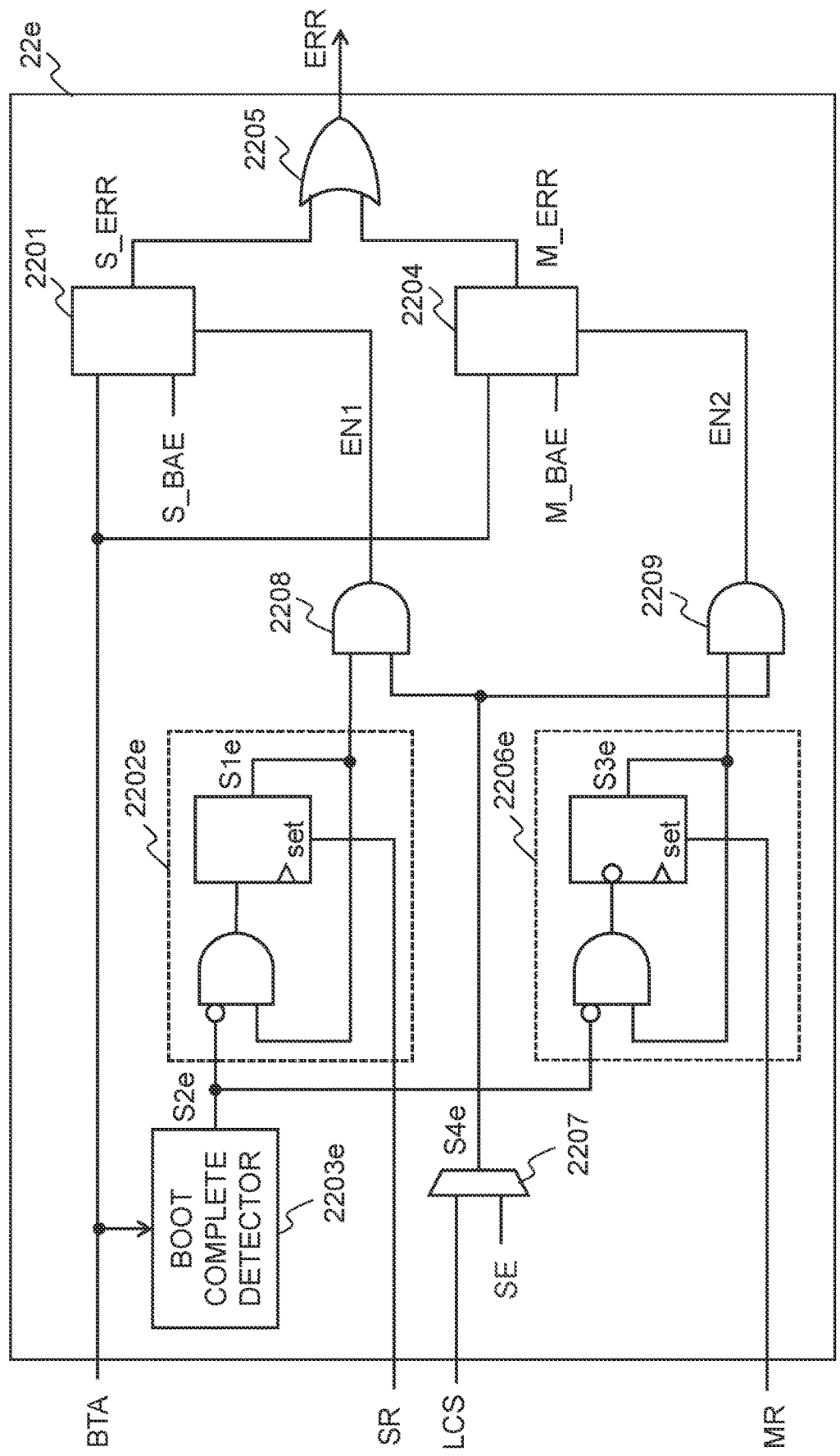
FIG. 19 is a block diagram showing a configuration example of an address check unit according to the modified example of the third embodiment.

FIG. 19 is a block diagram showing a configuration example of an address check unit 22e according to a modified example of the third embodiment. Compared to the address check unit 22d of the third embodiment shown in FIG. 16, the address check unit 22e is different in that it further includes boot-in-progress setting circuits 2202e and 2206e and a boot complete detector 2203e. The other components and operations are the same as those in the address check unit 22d of the third embodiment, therefore the same components are denoted by the the same reference numerals, and repetitive descriptions will be omitted.

The boot-in-progress setting circuits 2202e and 2206e have the same configuration and function as the boot-in-progress setting circuit 2202 of the modified example of the first embodiment shown in FIG. 5. The boot-in-progress setting circuits 2202e and 2206e are set by the system reset identification signal SR and the module reset identification signal MR, respectively. Both of the boot-in-progress setting circuits 2202e and 2206e are reset (cleared) by the boot complete signal S2e. That is, the boot-in-progress signal S1e is output after the system reset identification signal SR is asserted until the boot process is completed. The boot-in-progress signal S3e is output after the module reset identification signal MR is asserted until the boot process is completed.

Similarly to the boot complete detector 2203 of the modified example of the first embodiment, the boot complete detector 2203e observes the boot address BA included in the memory access request output by the processor unit 21e after the system reset is released or after the module reset is released, and the request receiving signal (not shown) from the bus 50, and generates the boot complete signal S2e.

Therefore, when the life cycle state signal LCS indicates that secure boot is valid, the comparison circuit 2201 is in an enabled state until receiving the request receiving signal from the bus after an instruction to reset the system is issued. In addition, the comparison circuit 2204 is in an enabled state until receiving the request receiving signal from the bus after an instruction to reset the module is issued. Each of the enabled comparison circuits 2201 and 2204 compares the boot address BA output to the bus 50 with the respective secure boot address expected value (S_BAE, M_BAE) and detects whether the address for accessing the secure boot program has been tampered with. On the other hand, when the life cycle state signal LCS indicates that the secure boot is invalid, the comparison circuits 2201 and 2204 are in the disabled state, and the tampering check of the boot address BA output to the bus 50 is not performed.

Therefore, according to the modified example of the third embodiment, as in the third embodiment, it is possible to detect whether or not the secure boot address specified after the system reset and the module reset has been tampered with. According to the modified example of the third embodiment, by providing the boot-in-progress setting circuits 2202e, 2206e, and the boot complete detector 2203e, when the secure boot is valid, the tampering check of the address of the memory access request to be output first after the reset is released is performed. Thus, it is possible to detect the secure boot address not only in the reset controller 10b but also in the processor module 20c has been tampered with.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
   a memory storing programs, the programs including a boot program;
   a processor configured to perform the programs stored in the memory; and
   a reset controller circuitry receiving a reset request, generating a reset signal for the processor based on the reset request, and outputting a boot address for the boot program to be executed after reset release to the processor,
   wherein the processor is configured to perform a tampering check for the boot address output from the reset controller circuitry, and output a boot address error signal based on a tampering check result, and
   wherein the processor comprises a comparison circuit which compares the boot address output from the reset controller circuitry with a boot address expected value to generate the tampering check result.

2. The semiconductor device according to claim 1, wherein the processor is configured to determine whether to execute the boot program based on the boot address error signal.

3. The semiconductor device according to claim 1, wherein the processor is configured to maintain a reset state when the boot address error signal indicates that the boot address is tampered with.

4. The semiconductor device according to claim 1, further comprising:
   a bus connected to the processor and the memory;
   wherein the processor is configured to generate a memory access request based on the boot address output from the reset controller circuitry to output the bus, and
   wherein the processor is configured to perform the tampering check for the boot address included in the generated memory access request.

5. The semiconductor device according to claim 4, wherein the processor is configured to stop the tampering check in response to a request receiving signal that is issued when the bus receives the memory access request.

6. A semiconductor device comprising:
   a memory storing programs, the programs including a boot program;
   a processor configured to perform the programs stored in the memory; and
   a reset controller circuitry receiving a reset request, generating a reset signal for the processor based on the reset request, and outputting a boot address for the boot program to be executed after reset release to the processor,
   wherein the processor is configured to perform a tampering check for the boot address output from the reset controller circuitry, and output a boot address error signal based on a tampering check result,
   wherein the processor is a first processor,
   wherein the semiconductor device further comprises a second processor,
   wherein the reset controller circuitry comprises:
      a reset control circuit configured to instruct a first reset and a second reset based on the reset request and to generate a reset identification signal to identify the instructed reset; and
      an address selection circuit having a first boot address and a second boot address and being configured to select the first boot address or the second boot address based on information indicated by the reset identification signal after the reset release, and
   wherein the processor has a plurality of boot address expected value each corresponding to the information indicated by the reset identification signal, and compares the selected boot address by the address selection circuit with the boot address expected value corresponding to the information indicated by the reset identification signal.

7. The semiconductor device according to claim 6, wherein, when the reset identification signal indicates the first reset, the processor compares all bits of the selected boot address by the address selection circuit with all bits of the boot address expected value corresponding to the information indicated by the reset identification signal.

8. The semiconductor device according to claim 6, wherein, when the reset identification signal indicates the second reset, the processor compares high-order bit data of the selected boot address by the address selection circuit with high-order bit data of the boot address expected value corresponding to the information indicated by the reset identification signal.

9. The semiconductor device according to claim 6, further comprising:
   a fuse module holding a tampering check necessity information that indicates whether to perform the tampering check by the processor.

10. A semiconductor device comprising:
    a memory storing programs which includes at least a first program and a second boot program;
    a processor performing the programs stored in the memory;
    a reset setting register set a reset request data by the processor unit, the reset request data indicating a first reset or a second reset;
    an address selection circuit including an address register and a selector, the address register storing a first boot address and a second boot address that are a start address for the first boot program and the second boot program, respectively, and the selector selecting the first boot address or the second boot address based on the reset request data set in the reset setting register, and an address check circuit including a comparator which compares the selected boot address by the address selection circuit with a first boot address or a second boot address expected value based on the reset request data.

11. The semiconductor device according to claim 10, wherein the processor receives the selected boot address from the address selection circuit and starts the boot program specified by the selected boot program when a result of the address check circuit indicates a match.

12. The semiconductor device according to claim 10, wherein the first reset is a system reset and the second reset is a module reset.

* * * * *